(12) United States Patent
Griffiths et al.

(10) Patent No.: US 8,788,569 B2
(45) Date of Patent: Jul. 22, 2014

(54) SERVER COMPUTER SYSTEM RUNNING VERSIONS OF AN APPLICATION SIMULTANEOUSLY

(75) Inventors: Tim Griffiths, Maidstone (GB); Gavin Willingham, Southampton (GB); Paul M Robson, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1233 days.

(21) Appl. No.: 12/295,397

(22) PCT Filed: Apr. 2, 2007

(86) PCT No.: PCT/GB2007/001195
§ 371 (c)(1),
(2), (4) Date: Sep. 30, 2008

(87) PCT Pub. No.: WO2007/113533
PCT Pub. Date: Oct. 11, 2007

(65) Prior Publication Data
US 2009/0300093 A1  Dec. 3, 2009

(30) Foreign Application Priority Data

Mar. 31, 2006 (EP) ..................................... 06251823
Mar. 31, 2006 (EP) ..................................... 06251825
Mar. 31, 2006 (EP) ..................................... 06251826
Mar. 31, 2006 (EP) ..................................... 06251828

(51) Int. Cl.
*G06F 15/16* (2006.01)

(52) U.S. Cl.
USPC .... 709/202; 709/203; 707/103; 707/E17.055; 717/113; 717/115; 717/140; 717/169; 717/175; 715/745

(58) Field of Classification Search
USPC ................. 709/202, 203; 707/103, E17.055; 717/113, 115, 140, 168, 175; 715/745
See application file for complete search history.

(56) References Cited

U.S. PATENT DOCUMENTS

| 5,948,089 | A  | 9/1999  | Wingard et al. |
| 6,298,478 | B1 | 10/2001 | Nally et al.   |
| 6,493,834 | B1 | 12/2002 | Bates et al.   |
| 6,769,123 | B1 | 7/2004  | Chan           |

(Continued)

FOREIGN PATENT DOCUMENTS

| WO | 01/61486 | 8/2001  |
| WO | 01/82066 | 11/2001 |

(Continued)

OTHER PUBLICATIONS

U.S. Appl. No. 12/295,380, Griffith et al., filed Sep. 30, 2008, publication No. US 2009-0172636 A1.

(Continued)

*Primary Examiner* — Thuong Nguyen
(74) *Attorney, Agent, or Firm* — Nixon & Vanderhye P.C.

(57) ABSTRACT

A server computer system comprising: means for permitting a first and a second version of a component or application to run on the server computer system simultaneously; means for identifying one of the versions as currently applicable and the other as not currently applicable; and means for connecting a requesting client to the currently applicable version in response to a request by the client to access the component or application.

16 Claims, 16 Drawing Sheets

(56) References Cited

U.S. PATENT DOCUMENTS

| | | | |
|---|---|---|---|
| 6,771,290 B1 * | 8/2004 | Hoyle | 715/745 |
| 6,922,796 B1 | 7/2005 | Matena et al. | |
| 7,155,462 B1 * | 12/2006 | Singh et al. | 717/170 |
| 7,653,914 B2 * | 1/2010 | Krohn et al. | 719/328 |
| 8,095,823 B2 | 1/2012 | Griffith et al. | |
| 2001/0002473 A1 | 5/2001 | Waldo et al. | |
| 2002/0046304 A1 | 4/2002 | Fabri et al. | |
| 2002/0049788 A1 | 4/2002 | Lipkin et al. | |
| 2002/0144250 A1 * | 10/2002 | Yen | 717/168 |
| 2002/0184226 A1 | 12/2002 | Klicnik et al. | |
| 2003/0051102 A1 | 3/2003 | Jacobs et al. | |
| 2003/0131053 A1 | 7/2003 | Gheorghe et al. | |
| 2003/0167421 A1 | 9/2003 | Klemm | |
| 2004/0006765 A1 | 1/2004 | Goldman | |
| 2004/0015936 A1 | 1/2004 | Susarla et al. | |
| 2004/0049769 A1 | 3/2004 | Lueh et al. | |
| 2004/0068721 A1 * | 4/2004 | O'Neill et al. | 717/168 |
| 2004/0123285 A1 * | 6/2004 | Berg et al. | 717/174 |
| 2004/0172625 A1 * | 9/2004 | Shinn et al. | 717/140 |
| 2004/0215754 A1 * | 10/2004 | Orleth et al. | 709/223 |
| 2004/0221268 A1 | 11/2004 | Nichols et al. | |
| 2005/0066337 A1 * | 3/2005 | Quinn | 719/321 |
| 2005/0097547 A1 | 5/2005 | Ramachandran et al. | |
| 2005/0125509 A1 | 6/2005 | Ramachandran | |
| 2005/0132349 A1 * | 6/2005 | Roberts et al. | 717/168 |
| 2005/0210124 A1 | 9/2005 | Chua | |
| 2005/0262475 A1 * | 11/2005 | Halpern | 717/114 |
| 2006/0048099 A1 | 3/2006 | Templin et al. | |
| 2006/0075398 A1 * | 4/2006 | Bennett et al. | 717/170 |
| 2006/0168574 A1 * | 7/2006 | Giannini et al. | 717/168 |
| 2007/0061792 A1 | 3/2007 | Atsatt | |
| 2007/0234352 A1 * | 10/2007 | Esders et al. | 717/175 |
| 2009/0172636 A1 | 7/2009 | Griffith et al. | |
| 2009/0276660 A1 | 11/2009 | Griffith et al. | |
| 2009/0320045 A1 | 12/2009 | Griffith et al. | |
| 2010/0199259 A1 | 8/2010 | Quinn et al. | |
| 2011/0251992 A1 * | 10/2011 | Bethlehem et al. | 707/610 |

FOREIGN PATENT DOCUMENTS

| | | |
|---|---|---|
| WO | 01/82071 | 11/2001 |
| WO | 02/091178 | 11/2002 |
| WO | 03/073206 | 9/2003 |
| WO | 2005/022383 | 3/2005 |

OTHER PUBLICATIONS

U.S. Appl. No. 12/295,387, Griffith et al., filed Sep. 30, 2008, publication No. US 2009-0320045 A1.

U.S. Appl. No. 12/295,404, Griffith et al., filed Sep. 30, 2008, publication No. US 2009-0276660 A1.

Extended European Search Report dated Aug. 4, 2006 in EP 06251823.8.

Extended European Search Report dated Aug. 28, 2006 in EP 06251825.3.

Extended European Search Report dated Sep. 14, 2006 in EP 06251828.7.

Extended European Search Report dated Sep. 13, 2006 in EP 06251826.1.

IPER issued Sep. 30, 1008 in PCT/GB2007/001195 and Written Opinion of the International Searching Authority.

European Examination Report dated Jun. 19, 2009 in EP 07 732 249.3.

Andersson, "A deployment system for pervasive computing", *Software Engineering*, Oct. 2000, pp. 262-270, XP010522536.

Moser et al., "Online upgrades become standard", *Annual International Computer Software & Applications Conference*, Aug. 2002, vol. conf. 26, pp. 982-988, XP010611242.

International Search Report for PCT/GB2007/001208 mailed Jun. 26, 2007.

International Search Report for PCT/GB2007/001212 mailed Jun. 19, 2007.

International Search Report for PCT/GB2007/001223 mailed Jun. 5, 2007.

Extended European Search Report mailed Aug. 23, 2006 in EP 06251824.6.

IPER issued Sep. 30, 2008 in PCT/GB2007/001208 and Written Opinion of the International Searching Authority.

European Examination Report dated Jun. 22, 2009 in EP 07 732 259.2.

Extended European Search Report mailed Aug. 3, 2006 in EP 06251806.3.

Extended European Search Report mailed Aug. 1, 2006 in EP 06251819.6.

IPER issued Sep. 30, 2008 in PCT/GB2007/001212 and Written Opinion of the International Searching Authority.

European Examination Report dated Jun. 19, 2009 in EP 07 732 263.4.

Extended European Search Report dated Aug. 4, 2006 in EP 06251822.0.

IPER issued Sep. 30, 2008 in PCT/GB2007/001223 and Written Opinion of the International Searching Authority.

European Examination Report dated Jun. 19, 2009 in EP 07 732 273.3.

International Search Report for PCT/GB2007/001195 mailed Jun. 26, 2007.

Office Action (9 pgs.) dated Sep. 24, 2010 issued in co-pending U.S. Appl. No. 12/295,404.

Response to Sep. 24, 2010 Office Action issued in co-pending U.S. Appl. No. 12/295,404.

Shen, Junrong, et al., "Towards a unified formal model for supporting mechanisms of dynamic component update", ACM SIGSOFT Software Engineering Notes, vol. 30, No. 5, ACM, 2005.

* cited by examiner

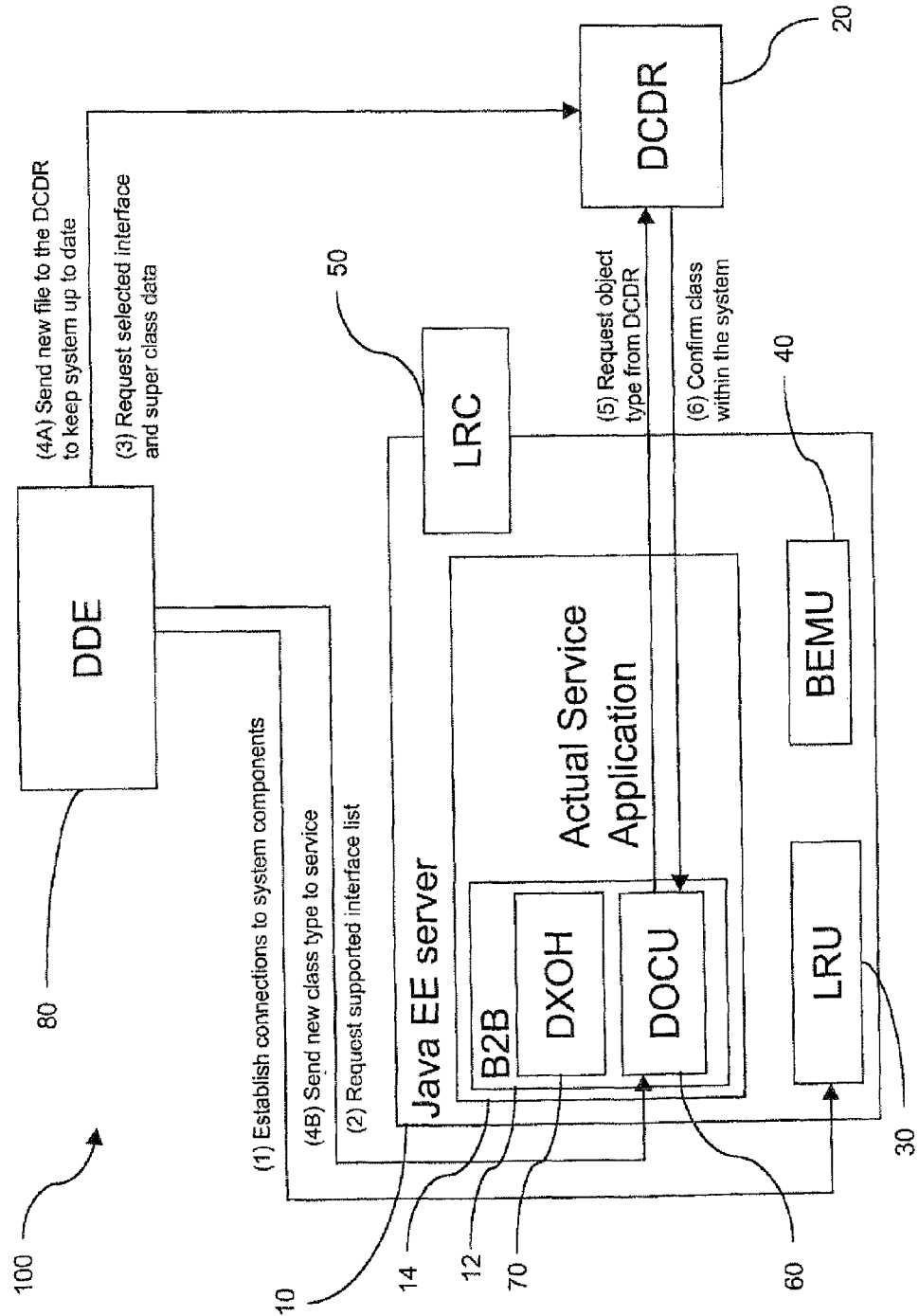
Figure 8(b): Business Object Creation

SERVER COMPUTER SYSTEM RUNNING VERSIONS OF AN APPLICATION SIMULTANEOUSLY

This application is the U.S. national phase of International Application No. PCT/GB2007/001195 filed 2 Apr. 2007 which designated the U.S. and claims priority to European Patent Application Nos. 06251823.8, 06251825.3, 06251828.7 and 06251826.1 all filed 31 Mar. 2006, the entire contents of each of which are hereby incorporated by reference.

FIELD OF THE INVENTION

The present invention relates to a server computer and a method of operating such a computer. In particular, the invention relates to a modified version of a server operating in accordance with a Java based server environment such as a Java Platform, Enterprise Edition (Java EE) environment.

BACKGROUND

Java Platform, Enterprise Edition (Java EE) (the latest version of which is known as Java EE 5—the previous version was known as Java 2 Enterprise Edition, abbreviated to J2EE) is a set of coordinated technologies and practices that enable solutions for developing, deploying, and managing multi-tier, server-centric applications (especially distributed applications in which different components of the overall application run separately from one another). Building on Java Platform, Standard Edition (Java SE), Java EE adds the capabilities that provide a complete, stable, secure, and fast Java platform for the enterprise. Java EE significantly reduces the cost and complexity of developing and deploying multi-tier solutions, resulting in services that can be rapidly deployed and easily enhanced.

Note that throughout this specification the term object will be used to refer to a computer program construct having various properties well known to persons skilled in the art of object oriented programming of which Java is a well known and commercially important example. Although the described embodiments of the present invention relate specifically to Java, it will be apparent that the invention is more generally applicable, especially as regards other object oriented programming languages.

In essence, Java EE enables an enterprise to develop a server application without needing to generate complex software for handling many of the functions generally required by server applications (e.g. of enabling connections to be made to the server application from remote clients, of providing security features to restrict access to features which only an administrator of the system should have access, etc.).

In particular, an enterprise may develop a server application by generating a number of small software modules known as "Enterprise Java Beans (EJBs)" which are fairly specific to the particular application. The EJBs are then "placed" into an EJB container which is an environment for running EJBs. The EJB container takes care of most of the low-level requirements of the application (e.g. implementing security and enabling remote clients to access the application).

A number of different types of EJB are typically used to generate an application. There are three main different types of enterprise bean: Session beans, Entity beans and Message driven beans.

Session beans are generally used to implement "business logic"—i.e. functions such as looking up data from a database and manipulating it to generate an output which is provided to a remote client. Session beans can either be stateless or "stateful". Stateless session beans are distributed objects that do not have state associated with them thus allowing concurrent access to the bean. The contents of instance variables are not guaranteed to be preserved across method calls. Stateful session beans are distributed objects having state. The state can be persisted, and access to a single instance of the bean is limited to only one client.

Entity beans are distributed objects having persistent state. They are generally used to represent an item of business specific data, especially data about a specific business entity (e.g. a piece of network equipment). In general, the persistent state may or may not be managed by the bean itself. Beans in which their container manages the persistent state are generally said to be using Container-Managed Persistence (CMP), whereas beans that manage their own state are said to be using Bean-Managed Persistence (BMP). In both cases the "persistence" is generally performed using a relational database as the backend data store and using an Object to Relational Mapping (ORM) function to convert between the object(s) associated with the entity beans and the backend relational database store. A particularly of used ORM is Hibernate (see www.hibernate.org for more details of this product).

Message Driven Beans are distributed objects that respond to Java Messaging Service (JMS) messages. JMS is a standard part of the Java EE platform which enables java objects (typically on remote devices) to asynchronously communicate with one another by sending messages between them. Message beans were added in the EJB 2.0 specification to allow event-driven beans.

A distributed server application may also include a type of object called a Managed bean, or Mbean. These are separate things to EJBs and are typically used to represent an application or device which an administrator would like to be able to remotely manage while the device and/or application is running.

Since the rapid uptake of the internet and the overlying World Wide Web (WWW), the paradigm of distributed processing has been taken from a favourable method, to one that now tackles large management problems in large networks and a common method of designing applications. The ability to distribute a system allows for a delegation of resources, processing and even operational logic (that can be regarded as black box functionality) to other components and also allows duplication of components in different locations to provide redundancy.

With the uptake of the distributed paradigm though comes an increasing dependency; the lack of availability of a component can cost businesses customers, time and money. This means that components have to be readily available, redundant to allow for load and reliability, and perhaps most importantly; externally constant. The necessity for constancy stems from the lack of knowledge regarding systems that are dependent upon the component. Across a business-to-business (B2B) interface only the integration expert that originally coupled the two systems knows the effects of changing either of the two communicating components, and in his absence the upgrade of either component will be shied away from (opting for legacy support instead), or will require extensive and expensive analysis and then almost certainly the requirement for another adapter, B2B interface or mid-way component to be constructed. Such additions solve the immediate problem, but tend to obfuscate further the interaction between the two components should a further change be required.

But in the modern environment, particularly with web-based systems, there is so much change and redefinition that was not picked up with initial requirement analysis, in such a short period of time, that updates are not only necessary, but required increasingly more frequently.

This is true not only for wide scale (Wide Area Network (WAN) based) distributed applications, but also on same-host locally distributed applications. The popularity of container-based logic, brought to popular use by JAVA EE-type servers, uses a distributed-type paradigm in a local sense in order to separate systems' business logic into a series of process components that have instances managed by a container, and interrelate through message passing. This type of distribution is just as vulnerable to the dangers of updating; a single component unavailable can render the system unavailable or worse still erroneous. Although there should be more knowledge of the systems (i.e. all the code should still be available for the system), external interactions can still introduce data to the system that can stress it in unpredicted ways. Adding or updating components themselves still leaves downtime (during the replacement of a component) and could cause loss of instances or a processing chain if there were active instances running prior to the update. Varying from server type to server type, it can be very difficult to just deploy one component of an application at a time; there is no uniform standard in JAVA EE for component replacement or indeed how to deploy an application.

Current methodologies to try and maintain "zero downtime" when updating or modifying a distributed application include server clustering of JAVA EE resources and federated applications. Both revolve around the concept of there being several servers running the same service or application. When an update is needed to be made, a server by server migration is conducted until all the hosts for the application are running the new version. This does allow for deployment analysis, and ensures that at no point is the service unavailable to the clients. What it doesn't ensure is ability to revert the logic after the update is complete, should an error be found. Also, although federating across multiple servers guarantees "zero down-time", the propagation time for the new logic could be sufficient to allow for a second update to occur during the period, which could lead to significant versioning issues. Furthermore, it generally requires the enterprise to have a number of physical computers, which can be expensive for small enterprises.

Clustering and federation do not take any further steps to allow for integration or extension of data types within the system. Receiving classes that have been previously unspecified is possible, and they can be handled, however should these then need to be persisted they would have to undergo a transformation to a known similar class (which is no simple task and is likely to involve a loss of data) or cannot be stored at all (due to the possible lack of presence in the received class in the system libraries).

SUMMARY OF THE INVENTION

According to a first aspect of the present invention, there is provided a server computer system comprising: means for permitting a first and a second version of a component or application to run on the server computer system simultaneously; means for receiving generic requests from a requesting client for the component or application to run, the generic request being non-specific in terms of which of the first or second versions should be used; means for identifying one of the versions as being currently applicable; and means for connecting the requesting client to the applicable version of the component or application to process the request; wherein the identifying means comprises means for associating a generic request with a currently applicable version of the specified component or application.

Preferably the server computer system automatically provides a version specific identity to a newly received component or application (provided by a system developer) and the version specific identity is only provided to clients in response to receiving a generic request for the newly received component or application whilst a non-version specific name is advertised more widely to clients who might wish to use the component or application.

According to a second aspect of the present invention, there is provided a logic replacement unit. Preferably the server computer system of the first aspect of the present invention includes a logic replacement unit.

According to a third aspect of the present invention, there is provided a server computer system component. Preferably the server computer system of the first aspect includes a component.

According to a fourth aspect of the present invention, there is provided an object persistence manager. Preferably the server computer system of the first aspect includes an object persistence manager.

BRIEF DESCRIPTION OF THE FIGURES

In order that the present invention may be better understood, embodiments thereof will now be described, by way of example only, with reference to the accompanying drawings in which:

FIG. 8(b) is a block diagram illustrating how the DDE interacts with the rest of the system in the creation of new business objects.

DETAILED DESCRIPTION OF EMBODIMENTS

This present embodiment comprises a framework of utilities and their strategic placement within a system (in particular a Java Enterprise Edition Application Server system—hereinafter referred to as a Java EE server) in order to allow for dynamic operation and maintenance of the system. This framework contains the extension methodologies needed in order to make a Java EE server capable of handling dynamic data and applications coupled with some new technologies for application development and persistence management.

The advantage of a dynamic distributed system is the ability to not only modify the system but also to allow for better B2B interaction, permanently accepting and handling new Object types being brokered from a remote system. In addition due to the flexibility provided by being dynamic it becomes possible to actually construct a live system from scratch by incremental online construction (real-time effective extreme programming).

With such a system, evolution of services becomes a considerably easier matter, with knowledge that in the event of a failure there are both manual and automatic reversion policies to protect the runtime of the service and system and keep interruption experienced by the clients to an absolute minimum.

Overview of the Whole System

Figure 1:
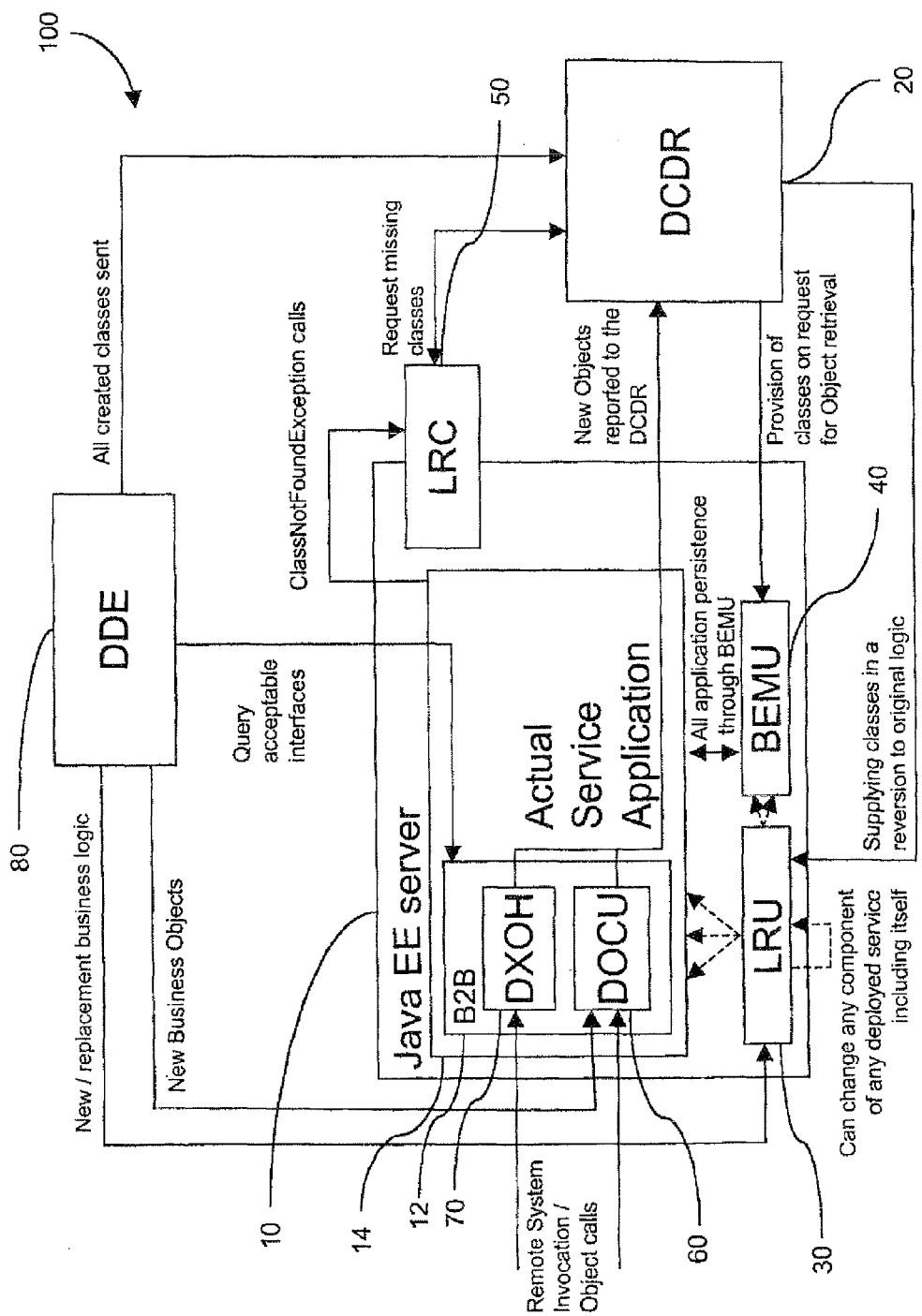
FIG. 1 is a schematic block diagram of a dynamic server computer framework.

Referring now to FIG. 1, an overview of the entire server framework 100 is set out below, before describing each of the components in more detail with reference to FIGS. 2 to 8(b).

As can be seen from FIG. 1, the framework comprises seven newly developed components: a Dynamic Component Description Repository (DCDR) component 20, a Logic Replacement Utility component 30, a Back End Management Utility (BEMU) component 40, a Load Recovery Component (LRC) component 50, a Dynamic Object Capture Utility (DOCU) component 60, a Dynamic XML Object Handler (DXOH) component 70 and a Dynamic Development Environment (DDE) component 80. Also shown in FIG. 1 are a Java EE server 10 which contains (in addition to some of the above mentioned components) an actual service application 14. The application 14 uses a Business to Business (B2B) interface 12, provided by the Java EE server 10, which interface 12 includes an instance of the DOCU 60 and the DXOH 70.

The Dynamic Application Server Framework (DASF) 100 is a collection of separately designed components that when used in union provide a sufficient resource to allow for on-the-fly creation of object types, real time modification of logic, abstraction of the underlying persistence from the developers perspective, storage and versioning of all classes within the system and full B2B object acceptance. In exchange the DASF does impose some constraints on the design of the system; however these are relatively minimal and are covered later.

The DASF framework can be sub-divided into three distinct categories; JAVA EE extensions (these change the functionality of either individual containers within the Java EE platform or the Java EE platform itself), services (these are Java EE platform compliant applications in their own right which run on the Java EE platform) and an editor (which is primarily a separate client application—although it cooperates with a configurable communication bean deployed on a respective server platform which may be considered as forming part of the DDE). The extensions are necessary to allow for retrieving or processing received data further than any standard Java EE library can, in order to facilitate the ability to capture or create received classes to allow persistent reuse. The services are deployable archives (e.g. Enterprise ARchives (EARs)) that conduct a role for the system as a whole. Finally, the editing utility is technically external to the system; however it connects to the system as a client and allows viewing of system state and development of new logic and business object types. Note, in an alternative embodiment, a further editor application could be provided which communicates with the DDE and provides a form based interface for enabling non-programmers to add new objects to the system by extending or amending existing objects. Such an editor is discussed in a little more detail below.

Java EE Extensions

Two of the extensions that the DASF makes use of are the B2B interface 12 style extension types; the Dynamic Object Capture Utility (DOCU) 60 and the Dynamic XML Object Handler (DXOH) 70. These utilities both come in the form of "import" libraries (or packages) that can be incorporated into an application in order to supplement the B2B interface type provided to the application by a container within the Java EE platform (though they themselves do not have to be externally facing).

There is a further extension, which is a small instrumentation program that is run upon server start-up called the Load Recovery Component (LRC) 50. This program is a small, configurable utility contactable on a port (this is a low-level communication method provided to the Java Virtual Machine (JVM) by the hardware/operating system of the device upon which the JVM and Java EE server platform are run—the LRC cannot use the Java Naming and Directory Interface (JNDI) or Remote Method Invocation (RMI) because these services will not necessarily have started when the LRC is loaded). The LRC is passed to the Java Virtual Machine (JVM) upon start-up (e.g. by providing a link to a file containing the byte code for the LRC as a parameter to the JVM on start-up). The LRC is designed to catch ClassNotFoundExceptions (or other similar exceptions provided by default and/or specified by a user) within any class capable of doing reflection-type class instantiation (this is a sort of class instantiation which is done at run-time even though the instantiating program does not know in advance how to instantiate the specific type of object); upon catching an exception it then stores state (i.e. the state of the JVM at that time) and attempts a class fetch from the DCDR or other known sources. If the fetch is successful, the state is restored before the instantiation line (with the class now available) and execution is enabled to recommence successfully.

The LRC 50 has the "last line of defence" role in the system, as it is the final utility that can broker (i.e. provide) new classes to the deployed logic before it collapses. It needs to be configured with a default exception and extension set, i.e. "ClassNotFoundException" and "InvocationTargetException." The LRC also has a requisition function which contacts the DCDR to request the class associated with the exception. A detailed discussion of this requisition function is given below.

The DOCU 60 has a role of intercepting classes received through an RMI based connection (including direct bean invocation—i.e. when a remote application directly invokes the functionality of a bean (e.g. a session bean) rather than interacting by sending an asynchronous message to a message driven bean) in accordance with a constraint filter (this is preferably one which examines the super-interfaces of a received class and compares these against (super-)interfaces of interest held within the filter). If the filter is matched and the class is not already within the scope of the dynamic system (i.e. the component is being brokered from another system via the RMI side of a B2B interface) then the class is passed to the DCDR as well as being entered into the environment local libraries (these are libraries/packages available to the server during runtime—they are generally only provided when initiating the JVM, but they can in fact be dynamically amended or added to during run-time).

The DXOH 70 has a similar role to the DOCU in that it intercepts data coming into the system that has no previously known definitions. However, the DXOH is active on text-based messages (i.e. messages sent as an eXtensible Markup Language (XML) message) where objects are only names and are not necessarily fully defined. Therefore upon detecting a message containing unknown object types, the DXOH constructs the object and an identifying schema for the object, from the instance, so that it can progress into the system and so that further similar object instances may subsequently be recognised. Any generated schemas and code are passed to the DCDR and stored locally, much like with the DOCU.

Supporting Services

In the present embodiment, the supporting services within the DASF are full-scale enterprise applications with multiple components and with standard, albeit high priority, deployment within the Java EE environment (i.e. they are deployed on the server before other applications—this is desirable as client defined services and applications could be dependant upon them, whereas these supporting services will never be dependent upon a client application). The supporting services are the Backend Management Utility (BEMU) 40, the Logic Replacement Unit (LRU) 30 and the Dynamic Component Descriptor Repository (DCDR) 20. Neither the DCDR nor the BEMU need to be located on the same physical server as the dynamic system itself; however, in order to be handled as dynamic components themselves they must be on the same server as a running instance of an LRU 30. In the present implementation the LRU is required to be on the same server as the business logic. This is for simplicity in locating services and performing the necessary aliasing (this is discussed in greater detail below) to update components; however, with some additional security related planning the LRU could also be implemented on a remote host.

With the BEMU and the DCDR, as both are required to be called from services, it is recommended that their naming is always kept the same, and if they are not on the local system there should be an alias object created on the local system, pointing to their remote location. This enables services (or applications) to query the local machine in a known, set, location to gain access to the components, even if the components themselves are not actually there. This also allows migration or movement of the components with a very minimal amount of fuss, and without having to change settings or redeploy any dependent services.

The DCDR 20 is a repository capable of holding versioned classes, applicable source and any appropriate descriptors (descriptors are typically configuration files which allow the application server to define the container environment in which a component will run—they are typically generated using an appropriate developer tool). The DCDR stores and provisions code through an RMI based interface, which may be a Java Value Type (JVT) interface, and acts as the backbone of the framework. The DCDR holds all of the code in the system together with all necessary descriptors, both in human- and machine-readable formats. The DCDR holds this information both in respect of all current components and in respect of every previous version of every component that has ever been within the system. Thus the DCDR contains the ability for a full system reversion to any previous version.

The LRU 30 is a facility that allows for the replacement of individual components of a system (or even of a complete system) without taking the service offline. It is also capable of taking additional logic that requires no replacement. Governed by the DDE, the LRU is also responsible for the handling of new logic in a transactional sense; allowing for rolling back of new logic or committing it permanently, as well as providing more advanced functionality such as providing automatic rollback in the event that some condition is met (e.g. more than a set number of errors thrown in a given period, etc.) which provides an assurance of service continuity (and validity) if new logic is not functioning within tolerable parameters.

The BEMU 40 is a logical evolution to a Container Managed Persistence (CMP) or Object Relational Mapping (ORM) utility. An ORM allows a container or manager to store objects for a service provided that a mappings file and a target database are explicitly provided/specified by the user/developer. The BEMU removes this requirement from the user. Instead, through the client facing interface of the service running on the Java EE platform (using the BEMU) the client program simply saves, removes, updates or queries objects with no further information needing to be provided. In addition the BEMU adds in the advantage of enabling automatic database redundancy and seamless migration. In exchange the BEMU only asks that the primary key for the object is stored or a generator class (i.e. a class which enables a primary key to be generated) is provided to it (provision can be through the DCDR should it be required by storing a suitable generator class in the DCDR).

Editors

The present embodiment includes just one editor, the DDE 80, to supplement the system. The DDE is aimed at technical development staff. However, in an alternative embodiment there is provided a further editor aimed at system administration staff with a lower level of technical and programming expertise.

The Dynamic Development Environment (DDE) 80 acts as a portal into the system. It can be used to create compliant new business objects, to update business logic components and to roll back system versions. It uses a connection to live system business logic deployed on a running server to provide acceptable interface types and templates for implementation and finally for performing context based analysis of a new class (rather than just Java syntactical analysis).

While the administration tool does not form a part of the present embodiment its proposed role is to fulfil the Administrator level Component Development Tool (ACDT) space. The ACDT would allow for structured Object creation via properties forms (no logic) and via a system of extensions of other (similar) objects (providing inherited logic), the ACDT would also be expected to be able to visually illustrate the state of the system and the topology employed, probably through a visual Managed bean (Mbean) viewer and this in turn could be tied into the generation of deployment diagrams.

System Connections

The manner in which the components of the DASF are connected is of considerable importance and, for the present embodiment, is described below.

The DCDR lies at the core of the system, holding all data types in both machine readable and human readable format as well as all versions of data types that have ever existed within the system as well. As a result, the DCDR is in direct contact with each instance of the DOCU and the DXOH to receive new classes and schemas from them as they enter the system. Similarly, the DCDR is also queried by the DXOH when attempting to gain a class file that matches a given schema. Further connections within the system to the DCDR come from the LRC requesting classes that weren't in the classpath during invocation and from the LRU requesting roll-back data or requesting deployment descriptors when deploying a bean.

A further connection, external to the system itself, exists between the DCDR and the DDE through which all newly created or/updated component data is committed to the DCDR, along with version destroy signals (on rollback).

The LRU is also connected to the DDE, being contacted to receive new and updated business logic as well as rollback instructions from a developer operating the DDE.

The LRU as illustrated in FIG. 2.1 also shows interactions (by dotted arrows) to all components within the system (i.e. an actual service application 14, the BEMU 40 and itself). What this actually means is that any of these components (if they lie within the scope of the local JAVA EE server) can be directly updated by the LRU.

Dynamic Component Description Repository (DCDR)

Introduction

For any form of truly dynamic system, it is important that new types of object be created, and existing types modified, within the system. In many situations, this must be accomplishable with zero downtime, as to avoid loss of mission-critical services. In any Java environment, including the Enterprise version (Java EE), whilst new classes can be loaded to a system, there is little to no provision for obtaining these classes, and no distribution mechanism to bring the whole system in line.

The Dynamic Component Description Repository (DCDR) 20 aims to solve these issues by providing a central repository within a system, or potentially multiple systems, that can provide the class data to any requesting component. In addition, to facilitate the update of classes, the version-specific source code will also be available, allowing a separate interface to manage modifications to business logic from any point in the system, without having to obtain the appropriate source code externally, or develop from start.

Component Description

Within a system, there can be many ways of describing components. The potential for description is limitless, but within current generation Java EE architecture, a large amount of data can be encapsulated in select meta-data. Fundamental to component description, is a definition of the components themselves. In Java, this is the "class" file; the bytecode representation of a Java class.

For on-the-fly development of components, the Java source code for each class is also a valuable asset. Although this can be derived from the compiled class bytes, it is preferable for this to occur only once, reducing overall overhead within the system, and for it to be stored in, and retrievable from, the same location.

Using XML-based Java message queues, objects can be passed between Java systems and any remote system, Java or otherwise, due to XML's inherent portability. Schemas to describe these object representations can be used to validate messages, and ensure that a known format is adhered to; ensuring that mapping of XML to the represented objects is possible.

Finally, within a Java EE environment, deployed objects require description of the environment to be created within the application server, to facilitate interaction with that object. This includes such data as global and local naming, as well as external/internal visibility.

Deployment Descriptors

In JAVA EE, deployable objects, such as Enterprise Java Beans (EJBs) or MBeans, require descriptors to enable the target deployment platform to initialise the environment in which that object is to reside. Unfortunately, due to the nature of Java EE, with varying implementations, these descriptors are platform specific; JBoss Application Server (AS) uses different descriptors to BEA's WebLogic AS. In a statically defined system, making use of only one platform, this is not an issue. However, within a fully dynamic environment, it is desirable for multiple platforms to be available to developers to take advantage of any differing technology they may provide. These differing descriptors may be differing in amount, in addition to content, for example, one platform may require three files for deployment description, compared to one for another.

In addition to the target platforms making use of the deployment descriptors, other components within the system may require use. An example of such a component would be a Dynamic Development Environment (DDE). When determining which deployable objects it can interact with during testing, the DDE requests objects based upon their definitions of remote and home interfaces, amongst other things. For the DCDR to return this information, it must be able to extract it from the deployment descriptors. With the flexible nature of the descriptor storage and format, an updatable list of extraction details must exist, describing how to extract the required information. With the possibility of the required information itself changing, this should be flexible enough to map an information identifier to the means of retrieving that data.

This identifier must be unique in a system-wide context, and a list of available identifiers provided upon request. This allows remote systems to query the list of retrievable data items, to discover whether that DCDR can provide the information which it requires. Whilst the specifics of extraction are beyond the scope of this document, this could be achievable using regular expression matching to identify the relevant data in the deployment descriptor.

Taking these issues into account, the DCDR must provide facility for multiple files to be stored, comprising deployment description. These files must be understood by the DCDR in such a fashion as to extract required information, such as the existence of local or remote interfaces, for use within other components. As such, a flag must exist for each entry within the repository, specifying the target deployment platform, if any.

XML Schema Generation

When dealing with the transmission of objects between systems, in certain situations it is desirable to send a textual representation of an object, rather than the object itself. This enables asynchronous communication, in addition to cross-platform capability. Furthermore, it is in line with Java EE methodology, facilitating the use of Message-Driven Enterprise Java Beans (EJBs). This form of EJB is tied to a message queue, and performs actions based upon the messages it receives.

Due, in part, to its growing popularity, XML is perfect for this form of transfer. Using XML, classes can be described using the elements, attributes and values of the mark-up language to encapsulate the attributes of a Java object.

To aid the conversion between an object and its XML representation, and back again, a 'schema' can be generated. An XML document itself, the schema describes the valid format for a document. The document can then be validated against this schema, determining if the structure has changed, signifying a change in remote data structures. For more details on document validation, and XML transfer, see the detailed description of the Dynamic XML Object Handler (DXOH) component below.

When a new class is added to the system, without a provided schema, one will need to be generated. Due to the automatic generation, it is only possible for this schema to describe fields with get/set methods, using them to access and store the data within the object. The names of these methods can be obtained dynamically, using reflection, by comparing those methods prefixed with 'get' or 'set' to those fields matching the rest of the method name. The method remainder is matched by inserting underscore (_) characters before any capitalised letter, and converting the whole string to uppercase.

When the list of attributes has been retrieved, a schema can be constructed, restricting the available elements of the document to zero or one of each attribute. The schema must encompass the message format described in the section discussing the DXOH, each element representing an object being named for that class, and sub-elements representing those attributes the object models.

Versioning—Overview

A consequence of multiple components within an overall system architecture, is the possibility of an update of one component affecting other components within the system. If a component is using a class, and this class is updated within the system, that component is now using a different version to other components. It is necessary to address this issue by forcing all components to obtain the latest version of any class, of which it makes use, within the system upon modification.

External components that interact with the system but do not comprise it, however, cannot necessarily be held by the same constraints. As such, forcing update of component types within the remote system is not feasible. Thus, the DCDR has a secondary purpose, allowing communication with remote systems, but providing their versions of classes to the external interfaces.

A useful approach is to store each version of every class, and its associated meta-data (source, schema, descriptors). This allows not only rollback of the classes, but simplifies update by providing the source for the current iteration, no matter how long it has resided within the system. Further to the rollback concept, if multiple classes are updated, the DCDR should store details of each class version at that point, to allow rollback of more than one class, if the changes as a whole are deemed unsuccessful.

Storage Structure

Figure 2A:
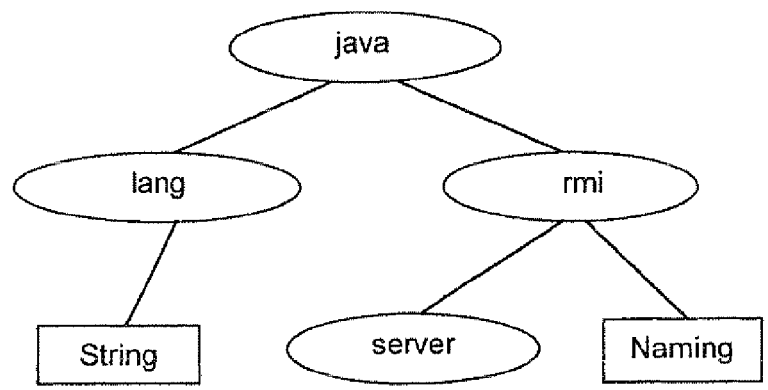
FIG. 2(a) is a schematic illustration of a class hierarchy used in the Java programming language which forms the basis of the hierarchical structure used for storing component descriptions within the Dynamic Component Description Repository (DCDR) component of FIG. 1.

The class hierarchy in Java is tree-like in its formation. The levels within the tree are comprised of the components of the package names. FIG. 2(a) illustrates the Java class tree. The ovals represent the package name components, and the rectangles represent the classes. At the file system level, this hierarchy is created using a directory structure, with directories for each package name component. For example, the 'java.rmi.server' package illustrated would be located within the 'java/rmi/server' directory, where '.' And '/' are the package and directory separators respectively. To store the component data, therefore, it is logical to follow this naming format.

Due to the multi-component architecture, and the allowing of external components to utilise differing versions of classes to those in use within the internal system, each class must also be stored with reference to its source component. This is done using the identifier provided upon class addition. If two sources are using identical classes, determined by comparing the class bytes, then a soft-link is created from one source's class node to the identical class node within the other source's tree (to save storage space—see FIG. 2(b)).

Figure 2B:
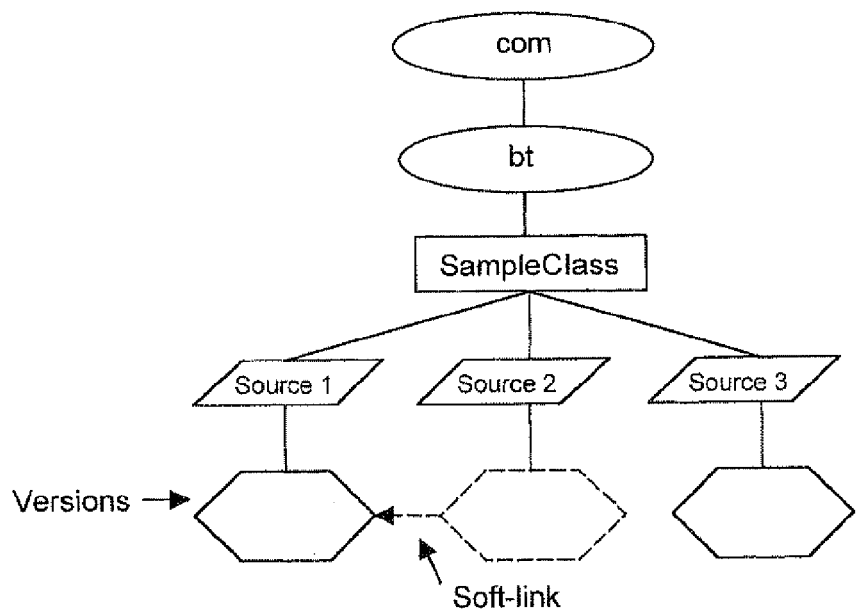
FIG. 2(b) is a schematic illustration similar to FIG. 2(a) showing the hierarchical structure used in the DCDR for storing component descriptions.

In FIG. 2(b), the hierarchy of the DCDR is described. Similar to the Java tree, classes are separated by their package name components. Beneath the class name indicator, sub-trees are created for each source. The soft links are indicated by dashed lined hexagons, with the arrow directed to the linked component description version. In this fashion, duplication of identical classes is eliminated. Each hexagon represents not only the class data, but also the meta-data, and is, in fact, a placeholder for a sub-tree of these elements.

Component Addition and Update

Figure 2C:
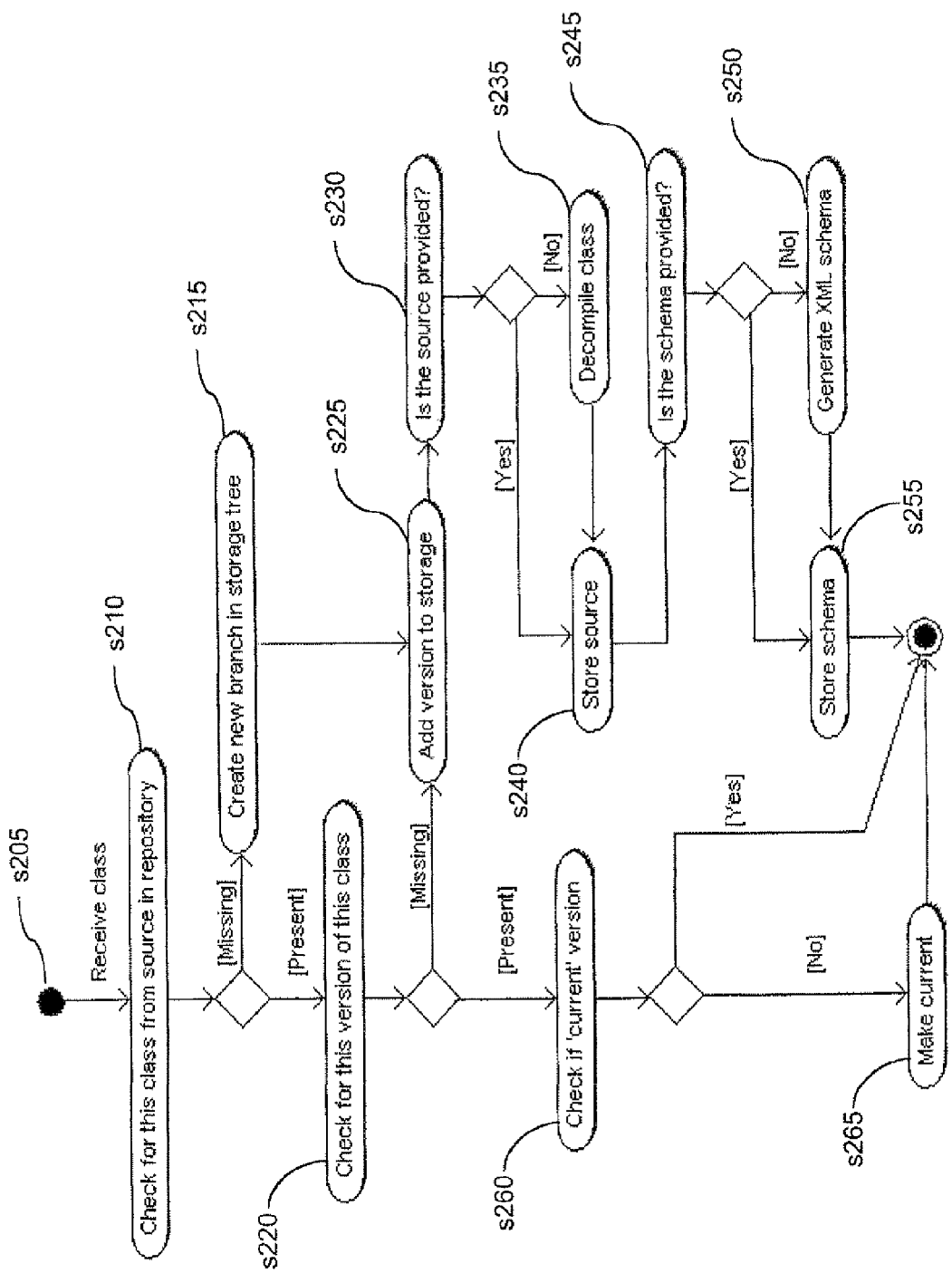
FIG. 2(c) is a flow diagram showing the steps involved in adding or updating a component description within the DCDR.

When a component descriptor is passed to the DCDR for storage, a number of stages have to be completed. FIG. 2(c) describes the process where a class itself is passed to the system (s205), but if only the meta-data is passed (source, schema or both), a similar procedure must be executed. Classes can be passed either in byte form, or in the form of the object whose class is to be stored. In the case of the object, instrumentation should be used to extract the class bytes of the provided object's class, in much the same fashion as the Dynamic Object Capture Utility, using the Java Instrumentation API. By creating a ClassFileTransformer object, the class bytes of every class are supplied when that class is loaded by the class loader; which occurs when the RMI call is performed, sending the object. These bytes can then be stored, awaiting retrieval by the DCDR. This is possible because part of every RMI transfer of a serializable object contains the class bytes of the object's type hierarchy.

The first stage (s210) is to check for the class within the repository, specifically from the specified source. If the class does not exist, or communications with this source have not previously occurred, new branches in the repository tree must be created (s215) and the class (and particular version) is stored (s225). If, on the other hand, the class is present in the repository from that particular source, a check is made as to whether the version of the class is stored in the repository (s220) and if not the particular version is then stored (s225)

(typically as the most current version of the class from that source). Note, if the class exists, matching the class bytes of a class that is stored in the DCDR, but the source tree is missing, this is created (in step s215 as mentioned) and a soft-link to the matching class version is simply provided before then ending the process.

After adding the new version to the store at step s225 it is checked whether the source for the class is provided (s230). If so, the source is stored (s240); otherwise, the source is first generated by decompilation (s235). After storing the source, it is checked whether the schema is provided (s245). If so the schema is stored (s255); otherwise the schema is generated first (s245). Note that the Java SDK includes a decompiler, javap, although the exact method of de-compilation is outside the scope of this document. XML Schema generation has been outlined above.

If at step s220 it is determined that the received object's class and version are known from the respective source flow passes to step s260 where it is checked if the received version is indicated in the repository as current. If so no further action is taken and the process ends. Otherwise, the received version is re-marked as being current (s265) this would normally occur if a remote system has rolled back to a previous version.

For instances where the schema or source, rather than class bytes, have been received, source class bytes can be created through compilation, or a reversal of the schema generation procedure.

In the special case of deployed objects, if indication of the target deployment platform is included, then the deployment descriptors can be automatically generated for the class, based upon the source code. Tools such as XDoclet could be used to aid in this process, but specifics are beyond the scope of this document. If no target platform is provided, then descriptor generation cannot occur, due to the non-standardisation between JAVA EE platforms. In this instance, the source is passed to a Dynamic Development Environment (DDE), and flagged for resolution.

Synchronisation

Whilst external components have individual sub-trees within the DCDR, all internal components share the same trees, all using the same versions of each class. Modifications to this class data can happen in any way determined by the system, for example using the DDE. The DDE enables component data to be retrieved from the DCDR and for the source to be modified, thus updating the local components within the system.

When any class stored within the DCDR is updated, via a DDE or otherwise, any component utilising those classes will need to be notified of the change, to ensure they then retrieve the latest version, and begin using it. Using a JMS message queue, this message can be broadcast to all components tied to the DCDR. This enforces system-wide compatibility.

To remain consistent with other aspects of the system, this message is formatted in XML, requiring only the class name of the modified component. See the XML listing below for an example message:

```
<?xml version="1.0"?>
<component-update>
    <class>my.test.Class</class>
</component-update>
```

Logic Replacement Utility

Introduction

Modern deployed systems providing a service are heavily relied upon in all networks, from small networks' internal services, such as a printer daemon, to internet-scale web services. There is also commonality in that "down time" of these services can be incredibly costly or at the least drastically inconvenient for all involved, hence there is a big focus on maintaining reliability of services.

However, the greatest downtime for any system is likely to be during replacement or at time of upgrade or maintenance. Current methodology would dictate extensive update testing on a stand-alone platform, then a test network and then full deployment at a non-peak time. However this methodology is not sufficient for a modern environment; non 'real' environment testing has no ecological validity and there may be hidden difficulties with changing the deployment on the real system, not to mention the unexpected knock-on effects that can occur in any other dependant system. This is coupled with the fact that in the modern world there is no such time as "off peak" as one locations night is another's business hours.

With an increasing amount of dependency upon distributed and deployed systems, there also comes a need for rapid "quick" fixes and regular updates in the aid of security and provision of new services. However there is still no known method of facilitating this.

The LRU is a utility that allows for transactional replacement of logical components within an actual deployment system with facility to quickly reverse the changes, monitor unhandled failures, manage reversion thresholds and commit changes made to the deployment archive. This gives the power to engineer in real time on the actual deployment system, in a faster, cheaper and safer manner than the current methodology.

Analysis/Research

The goal of this component is to reduce the time taken to modify and maintain a deployed system, whilst at the same time improving its reliability and integrity. The other application of the proposed approach allows for a fully "extreme programming" style approach in JAVA EE where components can be developed and added in on-the-fly, dynamically creating the system as the programmer works through it without the need to package files, redeploy or restart the server. Furthermore, where an enterprise does not have sufficient redundancy in its server hardware to allow one server to be taken off line while it is updated, the LRU can be used instead.

To modify a component without redeploying it or making it temporarily unavailable, a small transitional period will need to exist. During this period, running instances of the old methodology must be allowed to run to completion, whilst newly invoked instances should run with the new logic. This requires some detailed knowledge of container architecture manipulation.

The only current method of replacing is "hot deployment", which was introduced early in 2004 and has been the subject of much debate about its advantages and reliability since. Hot deployment involves changing all or part of the business logic within a container without the need to restart the container or server. This would sound ideal at first however there are some distinctly notable drawbacks:

1. Hot deploy requires continuous polling by the container of the deployment archives or components, this means that a considerable amount of server process time is spent checking, and for the most part is wasted.

2. Redeploying part of the application will re-instantiate the application, meaning that all handles to the component will be lost. This means that code must be explicitly written to test for a handles existence and instantiate upon failure. This is not intuitive, and may well not be compatible with other parts of the business logic.

3. During redeployment, any sessions that were processing within the updating component will be lost and since the redeploy takes a finite, but noteworthy, amount of time, all attempts to access during this time will cause server errors.
4. New libraries will not be hot deployed by default and so could cause the program to fail in deployment.

The requirement for reliability means that the LRU must have a facility for trialling and reporting on newly modified business logic, together with the ability to quickly revert to the original business logic if either the user or the machine deems performance of the new component to be unsatisfactory.

Finally, if the changes are seen to be effective they need to be 'committed' to the deployment archive themselves. This should be done on server shut-down in order to avoid archive re-deployment in change sensitive, hot-deploy servers (such as JBoss).

The only real requirement of the LRU in the present embodiment is that all newly modified classes that have new dependency libraries need to pass the LRU the dependent upon library classes as well in order to ensure that the modified component can run.

Design

The first consideration for the LRU design is whether the LRU should be capable of updating itself. Although it is likely that the LRU could run perfectly well without needing to be updated, on the provision that it has been thoroughly debugged and tested, it is the belief of this team that such a presumption would be falling into the same trap as modern deployed environment handling. This means that the LRU of the present embodiment is built as a container based application itself, in order to ensure that the service is not 'lost' for a period of time if it is updated.

Code Replacement

The approach to handling the replacement of run-time code without any interruption of service provides the most significant challenge for this system. The problem stems from the fact that all Java EE server implementations are different, the container specification itself accounts for only one page of the Java EE specification and it provides very rough recommendations rather than explicit guidelines. In an alternative theoretical solution to the problem a replacement could perhaps be implemented in a separate container, controlled by the LRU for temporary transitions, however in reality this would require a new, specific implementation of the LRU for each and every application server available.

A more elegant solution to the problem which is adopted in the present embodiment is to use the JNDI for intelligent aliasing of components, using temporary masking of the originally deployed components in favour of the newly deployed component upon successful deployment. This means that all new calls to the replaced business logic component (working on the presumption that business logic elements are EJB's or MBeans of some description) are passed to the newly loaded test component, with very little overhead. The system process for this is illustrated in FIG. 3(a).

Figure 3A:
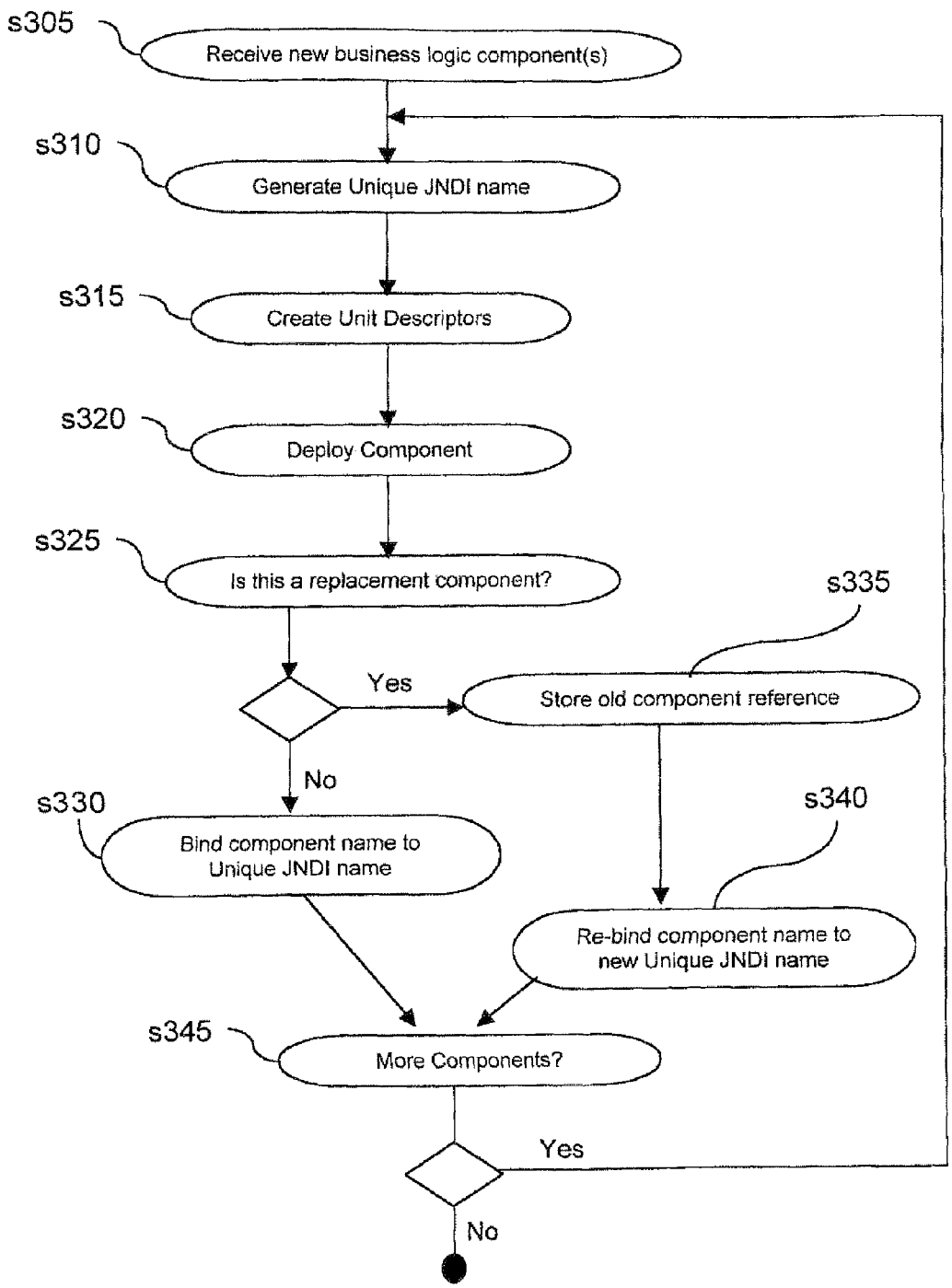
FIG. 3(a) is a flow chart illustrating the steps performed by the Logic Replacement Utility (LRU) component of FIG. 1 when deploying a new logic component in a dynamic manner.
Figure 3B:
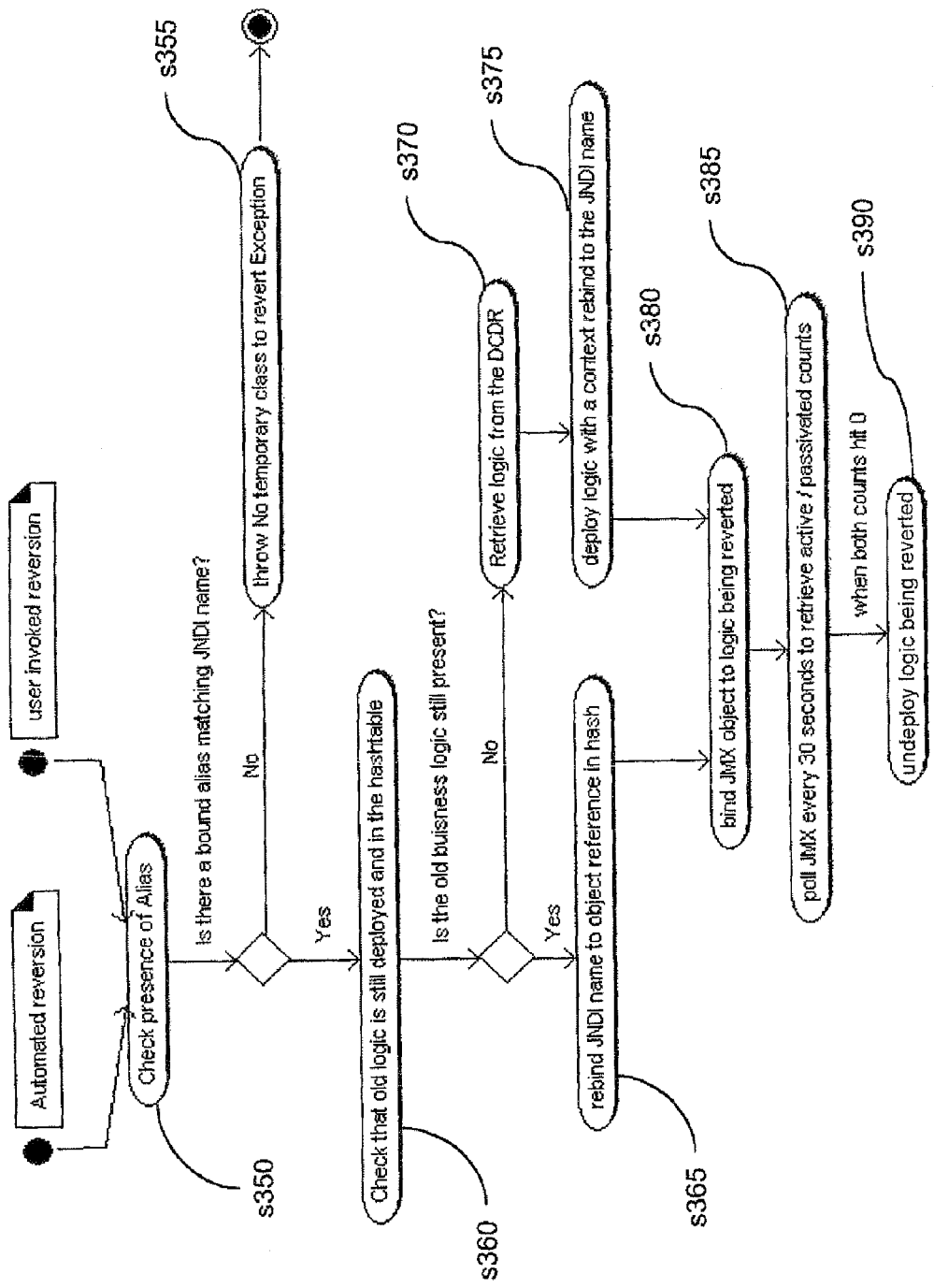
FIG. 3(b) is a flow chart illustrating the steps performed by the LRU when reverting back from a recently deployed component to a previous version of the component.

The following steps explain the logical steps of FIG. 3(a) in more detail:
1. Upon receiving the new business module (bean) and the association libraries (s305) the LRU locates the current JNDI path to the object and stores it in a temporary variable.
2. A random deployment name is generated within the target applications domain but with a unique and distinct name (s310).
3. unit descriptors are created for the new component (s315).
4. Using the name generated in s310 and the descriptors generated in step s315, the new business module is deployed to the container (s320). Note that unsuccessful deployment will be reported by the LRU throwing a "Deployment Failed" exception embedded within a Remote Exception, business logic will not be affected.
5. Upon successful deployment, a check is made as to whether the component is replacing an already existing and currently deployed component (s325). If not, then at step s330 the component name is bound to the unique JNDI name created in step s310 and the process proceeds to step s345. If the component is replacing an existing currently deployed component, then at step s335 the old component reference is stored (in case a quick reversion is required) and then at step s240 the component name is rebound (away from the old component reference) to the new unique JNDI name (i.e. the container handler for the old business logic is rebound to a new Alias object that point's to the newly created business logic's random deployment name) and then the process proceeds to step s345.
5. At step s345 it is checked if there are more components to be deployed in which case the process loops back to step s310 for the next component, otherwise the process ends.

However the above does not apply to Entity Beans, see the subsection headed Entity Beans below for a fuller discussion about this.

Code Reversion

To quickly revert to the original business logic of the system, a method of the LRU called "revert" can be invoked with the domain name. This domain name is looked up in the LRU's object reference hash to get the original container reference and then a naming rebind is called with the domain name and the old business reference is retrieved from the hash table.

An element of "garbage collection" is then needed to properly un-deploy and dispose of the unwanted "updated" business logic. It cannot simply be removed after de-naming from the JNDI because instances may still have functional calls/references being handled or about to be handled within a bean. If the container type is stateless then the problem can be solved simply by monitoring the number of instances in the container, when the number drops to zero then the session bean can be removed.

With stateful session beans a little more complexity will be involved because instances can be referenced in a more permanent context from other logical components. Stateful session beans can remain inactive within the system for periods of time, however they have to be renewed after a certain period of "passivated" time has elapsed, due to their removal from the temporary deployment directory. This means that the old logic can be safely removed whenever either the business descriptors for its container provide a zero count active and positive instance OR when there are no instances saved in the temporary directory.

A more preferred solution however, is using the JMX extensions for server management in order to monitor the instances of EJB's within containers. Even if a server does not have the JMX mappings to the EJB's implemented within the server it is a well-specified mapping by JSR-77, so a custom implementation can always be used and mapped onto the Java EE server of choice. The system flow will then look as in FIG. 3(b).

Thus, in order to revert to a previous version of a logic component (either because an automated reversion has been triggered or because a user has invoked it) at step s350 it is checked that there is an alias existing for that component (if not, at step s355 a NoTemporaryClassToRevertToException exception is thrown and then the process ends). Provided there is an alias, it is checked whether the old logic is still deployed and in the hashtable (s360). If so, at step s365, the old object reference is simply rebound to the component name and then the method proceeds to step s380. Otherwise, the old logic component is retrieved from the DCDR, a new unique name is created for the old component and the old component is redeployed with the unique name and the component name is bound to the unique name before proceeding to step s380. At step s380 a JMX object is bound to the component being reverted (e.g. a faulty component). The JMX is polled every 30 seconds to retrieve active/passivated counts and, when both counts hit zero, the logic being reverted is undeployed (s390).

Automated Code Reversion

Because the nature of this component is to facilitate immediate live updates, there is an enormous business risk to updating with faulty logic which could mis-handle thousands of requests before being noticed. The LRU itself can help with un-caught logic errors or program violations, however nothing can be done about incorrect value assignments, or incorrect logic by semantically acceptable processing. For this reason, a modicum of restraint should be maintained before updating business logic.

The LRU can revert the code to its original state, based on the number caught errors that have propagated out to the server level. The method for this handling is to instrument the server's logger method for exceptions with a call to the LRU's 'increment' method. This method simply increments a static count variable within the LRU. If Automatic code reversion is chosen upon test-deploying a new logic update, then a period and threshold level of errors is also specified. A timer is instantiated for the test deployment with a 'wait period' equal to that specified as a period parameter. The timer function then periodically checks the count variable to see how much it has incremented since last check, if the increased value is greater than that the amount specified by the threshold then the new logic can be said to be underperforming and an immediate reversion can be performed in the same manner as previously described.

Entity Beans

Entity beans are a harder problem still, because they are persistently backed against a storage medium, normally container maintained. When updating an entity bean structure, the underlying persistence database table structure will most likely have to be updated as well. This can cause enormous problems with compatibility to the new specification as even if the table schema is modified to add/remove the new fields the constructed new objects could have nulls in critical fields from old database records. The replacement of the Container-Managed Persistence (CMP) schema would also have to be changed dynamically for the new instances and quite possibly the Container-Managed relationships (CMR) as well.

Entity beans do not refer to business logic, but rather persistent data, despite the ability to embed substantial business logic within them. For this reason, the LRU is not a suitable tool for their handling, as the LRU knows nothing of the underlying storage components, only of the server and its containers. In order to replace or update Entity beans' structures a different utility is required.

In the present embodiment, entity beans are not used at all. Instead the BEMU is used to provide dynamically defined persistence within a JAVA EE server. An existing application being modified for use in the present embodiment should replace all of its entity beans with calls to the BEMU instead. See the BEUM description below for more details of this.

Back End Management Utility (BEMU)

Introduction

In almost all distributed systems there requires an ability to persist objects or data beyond the lifespan of a server's runtime, or because there is too much data to hold at once in physical memory. Traditionally such elements were critical to the operation of the whole system and are as such were normally planned at the very beginning of a system's design. Modern systems, especially distributed systems, allow for database redundancy, interchange and federation in order to ensure that not only is the data not lost, but the system can function with a partial loss of connectivity or allow for a database to be restarted. However, despite the flexibility of durability that modern persisted systems can attain, they are incredibly rigid when it comes to updating or evolving a system. For instance; although additions of fields can easily be made to a database, the code that queries this through an ODBC or JDBC connection will not reflect the change in code, and if the queries are weakly constructed (i.e. using column numbers rather than name), could produce a result set containing erroneous entries. Likewise if a piece of the system changes, and the internal business objects used gain or lose attributes, the persistence layer can been seen as a resistance to this change.

A typical question of which to update first is then presented. This can be complex to answer and needs to be very thoroughly thought out, in order to minimise risk to the system and its downtime in order to be updated. Currently, it is normally expected that if both the database and the system are out of date, then a complete offline update of the program is done as a whole, tested, analysed for possible conflicts and then finally set up as a new system and migrated-to over a period of time. This method is relatively safe, however proves exceptionally costly and will not always foresee all possible compatibility issues, so could require multiple cycles and a disrupted service.

The database itself does not require a change either; a new database, or repeated table, can easily be set up and configured and then used as the active database for evaluation purposes. Database schemas can be easily edited and committed to the databases and even databases can be migrated relatively easily; all that is needed is a small amount of human confirmation with how to handle the data transition, i.e. how to fill new fields from old versioned entries.

Given that the ability to replace or update the business logic of a system on-the-fly already exists, a logical progression is to design a system that can handle manipulations of the back-end storage on-the-fly as well, in a safe, online manner.

Analysis/Research

Initially looking at the problems with replacing a database entry it is important to consider in what ways the database is accessed. Traditionally, the database would be queried via a standard connector interface, invoking some form of query or instruction on the database. However, given the introduction of Entity-managed persistence, there is often another layer of manipulation, such as an entity bean persistence manager or a standalone object persistence library (e.g. Hibernate). These libraries create their own connections to a database and do all the low level queries in favour of exposing a higher level, more "user friendly" version of the querying. This however makes it hard to distinctly separate the database as the connectors start providing services themselves.

The only conclusion that can be drawn from this is that when substituting objects, the broker must take objects and decide how to store, retrieve and query the objects itself. This, however, causes complications with complex queries that may be written in an unsuitable language for the chosen underlying database.

One such language that does this is Hibernate, which takes objects and can add, remove, update and query using a wide variety of SQL databases. However, Hibernate in turn imposes its own query language on top, and although it provides a standard SQL query format, it needs to be parsed in a "Hibernate passable" format first, locking the query into a Hibernate specific style. This style is based upon EJB QL which is undesirable when using data that isn't expressly in object format; however such data is becoming increasingly less common.

In terms of selection of database, the Hibernate configuration needs to be given explicit mappings at the time of creating the Hibernate session. This means that for each underlying database that exists, there needs to be a different Hibernate session in order to allow same-time brokering to different databases. Hibernate also makes it difficult to change mappings between database and object once instantiated, although using the Hibernate API it is possible.

In order to dynamically manipulate and alter the backend of a deployed service a few extra powers need to be available:
1. Ability to add or remove database connections and their associated handlers from an externally visible pool.
2. Ability to enforce internal management fields not present within objects such as version number of the object type being persisted.
3. Admin level control of all databases so that tables/branches can be created as needed and removed after there purpose has been surpassed.
4. Abstraction of the actual table names away from the client programs completely, managing tables itself based on object type and version and calling program in order to prevent tightly bound connections.
5. In the presence of the requirement of tightly bound connections, the system should be able to use aliases so that the actual database(s) can be free to change location as versioning may require!
6. The system must be able to provide the facility for data migration when updating an Object/mapping type, so that all data is available even between versioning types.
7. Interaction with a dynamic modelling utility: Dynamic Development Environment should define handling policy during complicated transitions, however not the mappings.

The most important focus of the utility should be the ability to add flexibility to the rigid formats associated with back-end persistence. By allowing dynamic setup and management of storage utilities the programmer gains a far quicker way of administering and updating a system which when coupled with a Logic Replacement Unit (LRU) will allow for full development and maintenance of JAVA EE applications fully on-the-fly.

Design

In order for the BEMU itself to be replaced or upgraded, it must be noted that it must itself be running within the container framework, rather than as a server supplement or augmentation. This means that the brokering of the databases must be willingly programmed in the logical components to deal with handling a BEMU connection. This in turn means that the programming of logical components relating to the persistent store must in fact be consciously designed, or at least altered, with the BEMU in mind.

Further, the BEMU must have a higher starting priority than all enterprise applications that will make use of the BEMU, so that services cannot start without their connection broker. It is important to realise that the BEMU is completely separate from any other application, and unlike an Object Relational Mapping (ORM) utility, cannot be embedded in either the server for Container-Managed Persistence (CMP), or within the deployed service itself as a connector ORM.

With these considerations taken into account, the BEMU is designed as an extended ORM utility. This means that a static table entry, i.e. normal SQL type, will have to be populated into an object structure before it can be stored through the BEMU. This is potentially wasteful but a necessary step in order to allow for easy implementation and compatibility.

Figure 4A:
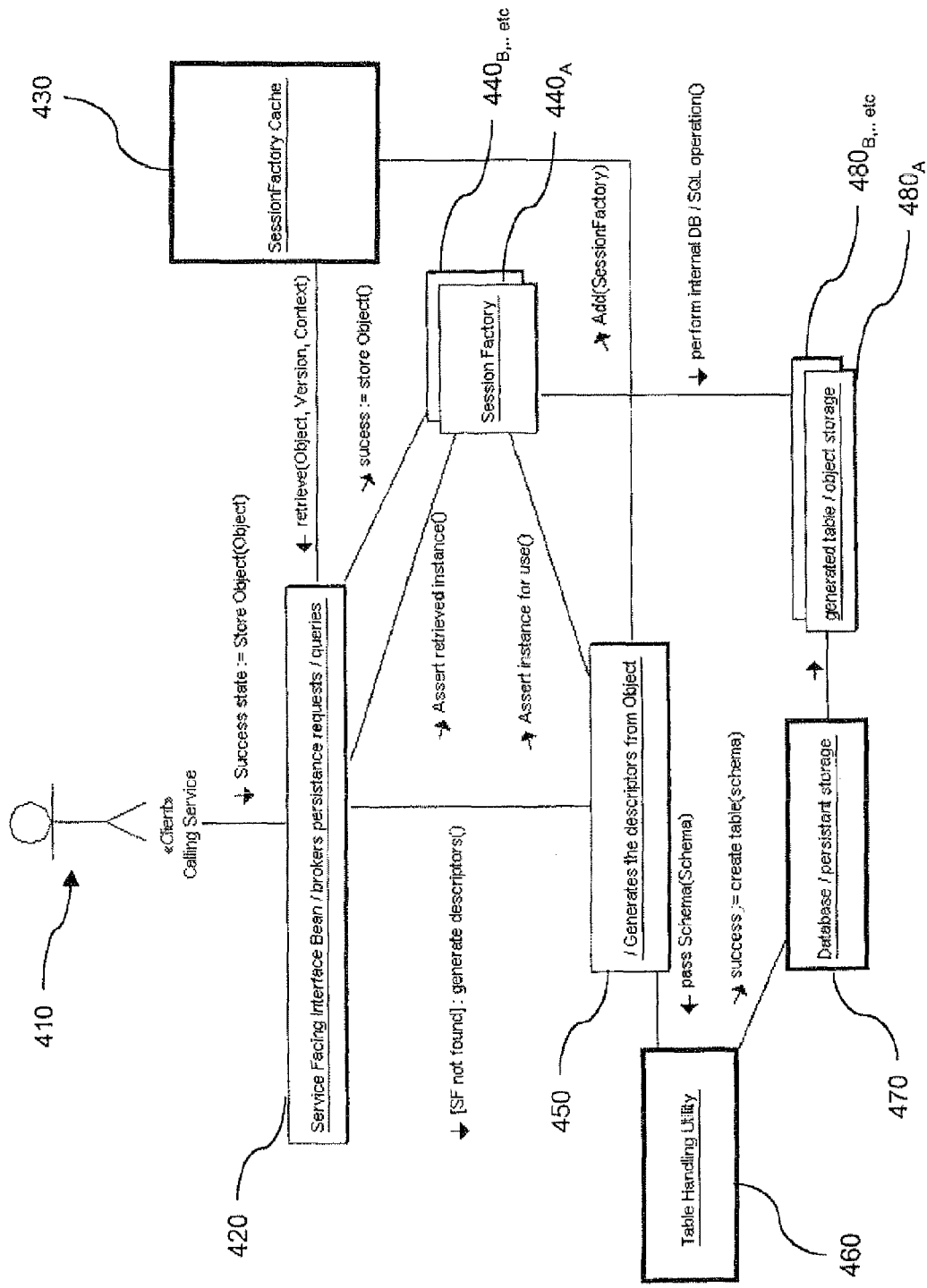
FIG. 4(a) is a schematic block diagram illustrating the sub-components forming the Back End Management Utility (BEMU) component of FIG. 1 and how they interact to provide dynamic, highly abstracted persistence of objects for client applications.

The collaboration diagram (FIG. 4(a)) shows the Hibernate ORM at the core of the system (as a block of Session Factories $440_A$, $440_B$ . . . etc). Hibernate is not the only suitable ORM, and the implementation can be built around any persistence manager that supports querying via EJB QL. The BEMU does not use just one instance of hibernate though, however, rather it keeps a cache 430 of connections to different object stores $480_A$ $480_B$ etc. across its supported databases. Depending upon the application context of the calling service, and the object type, the BEMU determines which exact object store it will use for the request. Also, an update to a storage object type will cause a different version to emerge, and provide a different table again (in order to allow for rolling back of object types as in the LRU).

Table Handling Utility (THU) 460

The BEMU is expected to act as the end point for all persistent storage within one or many system(s). In order to provide this persistence, the BEMU must have access to at least one or more physical databases 470. The BEMU must have complete control over all these databases 470, as it is expected that it will be creating and removing tables $480_A$ $480_B$ etc. as well as adding, removing, querying and updating fields. In order to separate the service facing side from the actual tables a table handling utility 460 is required.

This utility allows for the allocation of database resources in order to provide accommodation for required tables. Using a best-available-first delegation algorithm, it can create underlying tables in any of its resources (provided databases), and also deals with the provisioning, maintenance and removal of underlying resources. This means that the table handling utility is constructed of several sub-components, dividing functionality into procurement and release of resources, creation and destruction of tables by instruction and maintenance of connections.

THU 460—Procurement and Release of Resources

Resource procurement is the process of adding a database resource to the BEMU so that it can be utilised in the future for dynamic table creation. The procurement phase is initiated by contact from a client input device. This communication contains a location (connection URL), a connector name, file and location and finally the administrator access details; the BEMU needs a suitably high level of access in order to be allowed to create and remove tables in the database. In addition, if the type (class) mappings are different from the default SQL types, then a mappings hash can also be provided that can be used in place during construction of the Object mappings file.

The procurement component first tries to gain the connector using the information provided in the invocation. This could either be a web based URL to download and load from, or the file name itself (if the connector is already local). Failing this, the connector file can be uploaded to the Dynamic Component Description Repository (DCDR) and the Load Recovery Component (LRC) will pick up the absence upon initial load failure and fetch the class from the DCDR.

Once the connector has been loaded, an instance is created and the properties are set to the remote database location with the administrator details provided for user and password. The procurement utility will finally check connection by creating an arbitrary small table, adding to it, querying it and finally removing it. Upon satisfactory completion of these tests the details will be stored to the "available" hash.

In the future there may well be provision for automatic procurement of resources using SNMP "service up" messages or a network management program such as OpenNMS. This would gain the advantage that given a known set of used admin passwords, the BEMU could automatically provision databases as they become available and remove them as they go offline.

Resource release is very simple; upon detection or instruction that a database is no longer available for use, the Table Handling Utility simply removes them from the connection hash. Data being stored in this database should already have a redundant component elsewhere (a mirror of all data in another database), and requests by Object designate to the alternate data source. This is explained in more detail in 3.6.

THU 460—Creation and Destruction of Tables

The THU 460 has to be able to handle creation of tables and their subsequent removal. The service-facing side does not require knowledge of where the tables are stored, as long as it can handle its four main tasks. For this reason, it is delegated to the THU to select an appropriate resource from its pool of databases and one or more redundant resources for reliability (see the sub-section headed "Redundancy" below for more details). This policy of selection can be any suitable function, but a priority algorithm based on load of the resource, speed of the resource and predicted load of the storage type would provide a ranking scheme whereby the most preferable resources are used for primary and redundant storage. A simple round robin approach is also like to produce a fair distribution between the resources in a simpler manner.

Once the THU has chosen a resource, and one or more redundant resources, it has to convert the table requirement schema into the appropriate database-specific schema(s) for the chosen resources. This is done using a mappings file determining database specific types, and then the database-specific schema is committed via the appropriate resource connector(s). A dummy instance is then created and removed from the newly created table in order to ensure that instantiation has proceeded correctly. If instantiation does not proceed as planned, the THU selects another resource by algorithm until it finds a resource that accepts the table or runs out of resources to try.

Upon successful generation of the table, the Hibernate Session factory configuration file can be written by passing the connection details from the resource to the descriptor generator (see the sub-section headed "Hibernate session factory configuration" below for more details). The session factory is then subsequently created in the Server-facing side using the Hibernate API.

THU 460—Maintenance of Connections

In order to ensure that all connections are valid they must be periodically checked to ensure they are still active. This is important so that delegation to redundant resources proceeds before a query times out to an inactive primary resource. In order to maintain connections, a suitable polling period must be determined by the administrator of the system that houses the BEMU service. For each resource this polling period is implemented at a random offset so as to distribute the processing needed at intervals across the polling period. The polling itself takes the form of retrieving the connection from the connection repository, creating a single field table and deleting it. If an exception occurs in the process then the resource is marked in the cache as temporarily unavailable, and queries made where this resource is the primary holder of the table will be passed onto the first active redundant resource's session factory.

The other maintenance requirement is upon restarting a server. When the server is stopped, and then subsequently restarts, an unknown period of time will have passed. In this case the worst scenario must be presumed, and every resource should be checked as soon as the resources database is loaded. In the event of the resources database and its redundant alternatives not being available, the BEMU should broadcast a "failed exception" to any clients connected or connecting, and further stay active; dispatching non-functional exceptions wrapped as Entity Bean Exceptions to any further connections.

Descriptor Generation Sub-Component 450

The BEMU is designed to act as an ORM without configuration, meaning that deployment and mapping descriptors are not required from the developer, but rather the developer merely declares the Object type as "for storage" and the BEMU does the rest. In order to achieve this Object mapping schema(s) need to be created for each object, a database-level schema needs to be created, and finally a connection to the database table needs to be made in the form of a Hibernate session factory configuration file. Note that the descriptor generator 450 will tend to pick up such requests from a service facing bean 420 forming part of an actual service application such as actual service application 14 which in turn may receive it from a remote source such as a remote application 410 interfacing via the B2B interface 12.

Object Mappings Generation

The Object mapping schema defines the Object-to-table-name and property-to-field mappings that define how and where the ORM stores the object to the relational database. A mapping file can be easily obtained by passing the object structure of the Object or Entity EJB. Introspection gives the properties of an object, and the type and name of each property can then be extracted from the property in order to populate the fields as shown in the table below.

TABLE

Object mapping file with generation methodology annotation

```
<?xml version="1.0"?>
<!DOCTYPE hibernate-mapping PUBLIC
        "-//Hibernate/Hibernate Mapping DTD 3.0//EN"
        "http://hibernate.sourceforge.net/hibernate-mapping-3.0.dtd">

<hibernate-mapping>
        <class name="de.gloegl.road2hibernate.Event" table="EVENTS">
                <id name="id" column="uid" type="long">
                        <generator class="increment"/>
                </id>
                <property name="date" type="timestamp"/>
                <property name="title" column="eventtitle"/>
        </class>
</hibernate-mapping>
```

Header is standard that can be included at start of the construction of the DOM relationship defined between the storably type and a table, in the BEMU a table will be generated
The unique ID needs a generator class and an appropriate field mapping
Other properties are derived from taking the name as the property name, type as a mapping from java class type to underlying database storage, and column as formated name The code for such introspection should be relatively simple, and likewise writing the XML text stream and using it to create a Hibernate-acceptable Document Object Model (DOM). The code should be along the lines of the listing below.

```
try{
        BeanInfo bi=Introspector.getBeanInfo(beanClass);
        PropertyDescriptor[ ] pds = bi.getPropertyDescriptors( );
        for(int i=0; i < pds.length; i++)
        {
                //retrieve the important components of each descriptor
                //name of property
                String name = pds[i].getName( );
                //type for class, in order to associate suitable database type
                Class type = pds[i].getPropertyType( );
                //get equivalent database standard name
                String dbName = name.replaceAll("[A-Z]",
                "_$0").toLowerCase( );
                //Lookup type for DB equivalent type here, default to blob on
                no match!
                // Hibernate and SQL Schema line entry then goes here
                //     ...
        }
}catch(IntrospectionException ie)
{
    //problem with retrieving the properties info
}
```

Listing: Outline for Introspection on a Class in Order to Gain Properties for Schema Generation Database Schema Generation The introspection also gives the properties that the underlying database tables' fields should mirror. Standard naming convention will apply with naming these fields, so that queries to the BEMU in EJB QL can be handled. This convention involves taking Java object names and splitting on all capitalisations using underscores. The physical types (class type) of the objects can then be matched against a conversion type look-up table in order to get the suitable SQL type and this can then be used to form an appropriate database-specific schema. Note that this schema will have to be created in accordance with a template that exists for the underlying database type and must be supplied with the connector.

This means that the database schema created in the Schema generation component is more of a pseudo-schema, made with an array of database formatted names and a corresponding parallel array of class types. This pseudo schema object is then passed to the THU where upon decision of the underlying resource(s) that the object will be stored to will be converted to full schema(s) via the database-specific mappings file.

Hibernate Session Factory Configuration

The other descriptor needed is the Hibernate session factory schema. For each table that the BEMU is managing (each object structure), and for each resource, there needs to be a unique Session Factory instance. It is easily possible for a Hibernate Session Factory to have more than one ORM; however as a Session Factory is an immutable class, subsequent addition of new ORMs to the Factory is prohibited which is contrary to the behaviour required for the BEMU.

Given that a Session Factory needs to be constructed for each ORM, the configuration file for the Session Factory instance needs to be constructed. The Hibernate configuration file is generated from the connection settings, native dialect and connector class, and one or more ORMs, together with some standard properties regarding the particular internal factories that Hibernate itself should use for transactions and caching policy.

The generation of such a configuration file is straightforward, generating as a WC3 standard 'document' with the pre-defined header information added and a session factory as the only sub-node. To the session factory node the static properties are added such as the Transaction and caching libraries to use. The connection details and address are defined in the THU and are passed to the Descriptor generator after the THU has allocated a suitable resource and table for the ORM, together with the connector class name and the underlying database's dialect type. These properties complete the Session Factory configuration document, which can then be used to instantiate a Session Factory instance via the Hibernate API (see example Session factory configuration file below).

Session Factory configuration file with generation guidelines annotation

```
<?xml version='1.0' encoding='utf-8'?>
<!DOCTYPE hibernate-configuration PUBLIC
        "-//Hibernate/Hibernate Configuration DTD 3.0//EN"
"http://hibernate.sourceforge.net/hibernate-configuration-3.0.dtd">

<hibernate-configuration>

<session-factory>
        <property name="hibernate.connection.driver_class">org.hsqldb.jdbcDriver</property>
        <property name="hibernate.connection.url">jdbc:hsqldb:date/test</property>
        <property name="hibernate.connection.username">sa</property>
        <property name="hibernate.connection.password"></property>
        <property name="dialect">org.hibernate.dialect.HSQLDialect</property>
        <property name="show_sql">true</property>
        <property name="transaction.factory_class">
            org.hibernate.transaction.JDBCTransactionFactory
        </property>
        <property name="hibernate.cache.provider_class">
            org.hibernate.cache.HashtableCacheProvider
        </property>
        <property name="hibernate.hbm2ddl.auto">update</property>

<mapping resource="de/gloegl/road2hibernate/Event.hbm.xml"/>
    </session-factory>
</hibernate-configuration>
```

- Standard Header information that doesn't change for configuration, may need occasional update every 6 months to a year
- Driver name, passed from THU after fetch connection details, passed from the THU to the generator.
- Native underlying database dialect provided from THU
- Default fields, showing SQL for the sake of a testing, production should be "false" standard hibernate classes for transactions and caching
- name of the mapping file just created for the Object mapping Migration of Components The nature of this system is to allow the evolution of another system without the need to take that system offline for maintenance. Although most updates in a system will require the modification of business logic in order to improve the functionality and stability of a system (see the LRUII), there will be a need to update the data being persisted. In the case of Objects this could be induced by a change in the way an Entity EJB is structured with the addition or removal of fields that are surplus to requirements. In order to effect this change, the system would either have to update the table mapping on-the-fly (which hibernate prohibits), or create a new version and migrate the data across.

The problem with migration is how to conduct it. The data of the old type may now be meaningless and so should be left in its original position by means of archive. Alternatively, the data could be still useful, however will have superfluous information or missing fields. In order to migrate properly, a decision must be made as to how to handle missing fields. It may be that the new version of the bean requires these fields intrinsically within the business logic, such as a timestamp, and their absence could cause a system failure or collapse of a service. In order to avoid this, consultation with a developer is preferable, especially as the developer must be on hand as the new backend structure will have just been committed via the LRU.

This kind of migration can show up in the user's DDEI as a versioning issue and can show the new version's data types next to the current version's data types in order to illustrate the discrepancies and allow the user to specify a default value for the ambiguous fields or to leave them null. A decent alternative would be to specify the default value for all fields within the Entity Bean (or Java Object) being updated. This would mean that all the previously unpopulated fields would gain default values during population.

Figure 4B:
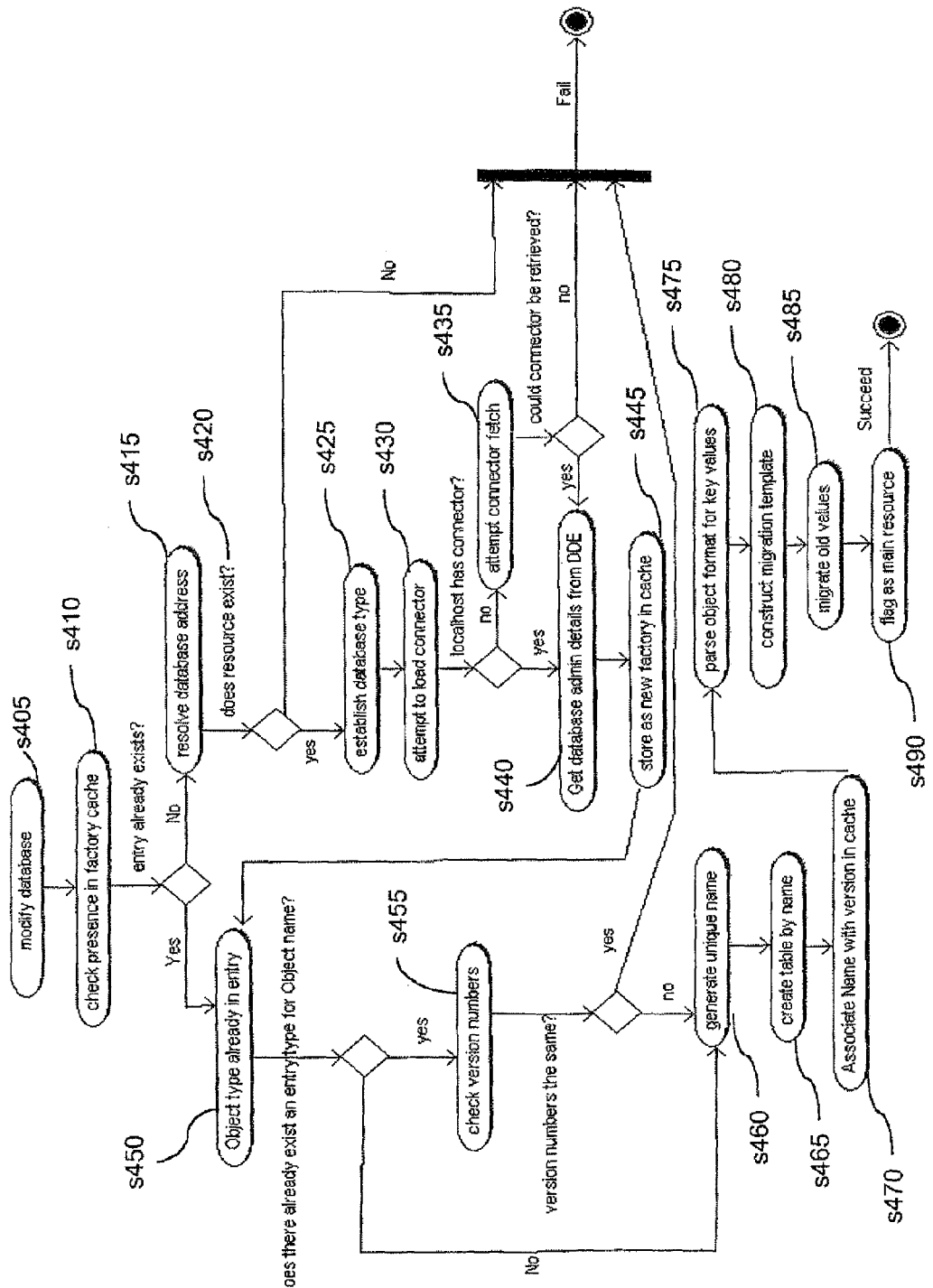
FIG. 4(b) is a flow chart illustrating the steps performed by the BEMU in updating a persistent component (such as an entity bean) to enable data to be migrated from the old version to the new version.

In FIG. 4(b) the entire logical process of accepting an updated storage class and the subsequent migration is illustrated. Note that the progression is through the entire BEMU system, and does not just illustrate the behaviour of the migration activity.

Thus at step s405 a request to modify a database is made by or to the BEMU. At step s410 the BEMU checks if a connection to the database to be modified is present in the factory cache. If it is the method jumps straight to step s450, otherwise it goes to step s415 in which the database address is resolved; if the resource is found to exist (s420) the method proceeds to step s425, otherwise the attempt to modify the database fails. At step s425, the type of the database is established and then an attempt is made to load a connector to the database (s430) if the localhost does not have the connector then at step s435 an attempt is made to load the connector from a remote source. If a connector is obtained either in s430 (locally) or in s435 (remotely) the method proceeds to step s440, otherwise the attempt to modify the database again fails. At step s440 the connector and the new database are stored in the factory cache and then the method proceeds to step s450. At this point a check is made as to whether the object type to be stored is already present in the database entry to be modified. If so, the version number are checked at s455. If these are the same no update is needed and the attempt to modify again fails. If either the version numbers are different or there is no similar object contained in the database entry to be modified, then at step s460 a unique name for the a table is generated, then at step s465 a new table is created by name and the name is then associated with this version in the cache (s470). The method then proceeds to step s475 in which the object format is parsed for key values, to step s480 in which a migration template is constructed, to step s485 in which the old values are migrated and finally to step s490 in which the new table is flagged as the main resource.

The Migration itself (step s485) is by nature a slow process due to having to copy the entire of the original database to a new location. Therefore the system should have the facility to do two types of migration: thorough and dirty.

Thorough Migration

Thorough Migration, as the name implies, is the detailed and transactional process of copying all the data from the old table to the newly created updated table. The original table is kept for the process of immediate reversion should the need arise, providing immediate recovery from a possibly faulty change in business logic, needing a new version in back-end storage.

Thorough migration is effected by doing a query fetching all Objects (of the old version type) from the underlying store, and one by one storing them to a new data store by iterating through a result set. Each item retrieved is used to populate a new type version of the object on a field-by-field basis being requested from the new type object. Any method access exceptions from the old type object are ignored and the default values are used on the new Object, in turn the "obsolete" data fields are never copied across from the old Object, as the new type does not request them. The version of the new type instances are still set to those of the old type, to signify that they were not originally created as the new type.

Thorough Migration will be slow, database- and processor-intensive, and should not be done regularly or on databases with vast amounts of data. I does, however, provide assurance that the data will not be lost or corrupted by the transition, and provides the ability to immediately revert, and indeed co-operatively use the old data source (running new and old classes simultaneously with synchronisation between the new and old resources).

Dirty Migration

Dirty Migration must also be provided as part of the system in order to handle very large volume databases receiving a critical update. Dirty migration works by first constructing a cross-comparison between new and old object types, establishing what fields have been removed and those that have been added (and their corresponding default values). The Dirty migration simply then performs an update on the table structure, removing the old fields and adding in the new. Finally a table wide update is done on all records setting the new fields to the default values.

Dirty Migration is therefore as fast as a database update can be, allowing for migrations of databases far too large to be manipulated as Object results sets. However it does not assure successful reversion to the original data type, in the instance of fields being removed to progress to the new type the best Dirty Migration can do is re-instantiate the old schema with default values for the previously removed fields.

Other Migration Considerations

The migration choices are important and a further design decision must be made on an implementation by implementation basis as to whether the Migration warrants defaults or user specified conversion.

Also type of Migration, Reversion policy and migrate or "start anew" are important questions that need to be asked of the Service developer in order to ensure the best performance of the BEMU for their needs.

Object Policy and Reversal

Much like the LRU, the system needs the ability to revert to previous versions. The actual reversion of the Object types (such as entity beans) themselves will still be handled in the LRU, however upon rolling back an Entity type object it will signal to the BEMU that the "system version of an Object of type [x] given context [y] has been reverted to version [z]". In the event of receiving such a message the BEMU immediately does its best to bring the Object version that it is using in line with the required rollback.

It is at this stage that the Object policy is important, especially as the policy needs to depend not only upon the constraints set by the developer but the time period elapsed as well, and the probability that "successful traffic" has occurred within the system.

For example; take a small internet-based company, selling items from a website which is powered by JSP deployed on a Java EE server. If the developers of the site decide that post-release they need to update the order forms so that there are 3 address lines rather than 2, they will change the JSP code (via the LRU), and the appropriate storage container Object (an addition of the new field). This new deployment is in effect for a couple of days, then due to a problem or malfunction, it is decided that they need to "roll back" with the LRU to the original version. The dilemma then presented is; "what happens to the data in the new table built on the newly deployed object type?" During the two day period there will have been orders placed that the company does not wish to lose, however simply migrating the new data to the old format may be insufficient to process the order as clients will have spread their billing address out over three lines instead of two, thus will lose part of their address during the migration. How should the reversion proceed?

The type of problem laid out above can only be solved by offering all acceptable solutions to the developer and hoping that the developer makes the correct decision upon deploying the update in terms how he or she wants the roll back to take effect. In order to allow for this, the Object policy component should be stored in every Session Factory that is being produced to handle an update of a business component. This Object policy is passed as an extra parameter to the update; if one is not provided then a sensible system default should be provided in its place.

The Object policy component itself should be an Object containing the period of time that determines immediate reversal (malfunctioning code), the number of successful transactions that determines at least limited functional use, and the four appropriate action states for being above and below each of the two deterministic thresholds.

The action states would be a member of an enumeration with the likes of, destroy all new, clones to old or run custom method. The run custom method would come attached with a method that would handle the transformation back to the old type manually, so as not to lose any data or preserve the new information gained in a more traditional manner.

BEMU Configuration Persistence

The BEMU itself contains a lot of configuration data that must be kept should the deployment server need to be reset or be struck by failure. The majority of the data the BEMU can persist itself with allocation through its own service-facing component, storing hash tables of resources and service factories.

This recursive policy would infinitely spiral unless the initial values for the BEMU were already loaded; therefore there must be some form of properties file, which contains the database address, database type, administrator details and Object class name. This will allow the re-instantiation of the Session Factory that maintains the resources and service factories and these are all loaded into memory and checked (run a self diagnostic in the form of a query for session factories or add/query/remove table query for the resources).

Any failed resources are flagged and loaded into a "load failed hash". The load failure notification should then be held and presented to the next administrator program that connects to the utility, in an effort to repair or confirm the removal of the resource.

The storage of the BEMU must occur whenever the server is being shut-down. The best way to assure this is to have the core details kept as a singleton Entity bean that is constantly updated. In the case of a BEMU update a table migration will naturally occur, in this case the starting properties file will need to be changed, however it is best to change this file during migration rather than at server termination as described in 3.3.

Redundancy

Much like all good databases, the issue of maintaining the system should one of the back end resources fail is of great importance to the system. The redundancy for the BEMU is planned to be much like all other distributed database system; additions, removals and updates are committed to a number of databases that contain the same data. Queries are distributed across all databases in order to speed up processing time.

The BEMU operates a user-defined policy of allocating at least a primary resource and 1 or more reserves in order to ensure that should one database fail this should not be a problem. Not only that, but because the BEMU has access to all other databases, if the need is dire enough (the absence of available resources for a table meaning only having one instance or violating a user specified minimum number of redundant instances) the program can do a background "thorough migration" to a new resource in order to re-establish the redundant and thus reliable nature of the system. Further redundancy can then be established on top of this by federating multiple BEMUs on different servers.

Load Recovery Component (LRC)

Introduction

A modern deployed system is capable of receiving and creating objects that were not originally part of its initial definition. It is also possible that the inverse is possible; systems have class names available to them, but no physical class that matches the instantiation name. This danger of trying to instantiate a class that is no longer present, or has never been present, can lead to a "class not found" exception and subsequent failure to progress within a system.

Such situations can arise when receiving a notification from federated systems (Object Message), or simply when the local system does not have the class persistently stored, such as when retrieving a dynamically created class from a persistent storage medium. These failures are hard to predict and impossible to progress if they occur, meaning that business logic has to terminate useful instruction and potentially incur loss of service. Loss of service is damaging both in terms of public image of a company and financially, due to violation of dependant service contracts or online sales, (customers will just go elsewhere in the absence of the service), and therefore it is imperative that they be avoided.

The LRC 50 of the present embodiment provides a utility that can tackle such problems as they occur, rectify the problem and resume the run-time, incurring only a small cost in processing overhead for the price of saving the service and the client sessions already running.

System Design

The Load Recovery component (LRC) is, in the present embodiment, started up as a server utility (though in an alternative embodiment it could be started up as the primary service) as it needs to be able to instrument all other classes that are subsequently loaded. In fact it is a little more intelligent than that, pre-passing a class in order to see if it contains any calls to 'Class.forName( )' (this is a well known method in Java forming part of the reflection API by which information about the class of an object can be obtained from an instance of the object) or receiving any message events (which could be Object messages).

The LRC provides a "last line of defence" utility that can be programmed to fetch classes from a wide variety of sources. It is initialised with a series of system classes corresponding to Exceptions that it must action to in the event of them being thrown. These would normally be of the type of class "ClassNotFoundException" (CNFE), however should the user require a class fetch on a different Exception type, or types, then further arguments can be provided and the LRC will instrument in an appropriate manner.

The LRC is based around three core modules, each of which provides a core facility. The facilities are Instrumentation, requisition and management. Instrumentation occurs when a class is first loaded, if the class contains use or possible use of a target exception then it is instrumented to catch the exception and call the LRC body (requisition). (Instrumentation is a well known term in the art. It relates to the process of amending code. Generally it is used for de-bugging of code. However, the recent implementations provided in the latest version of the Java SDK enable instrumentation to be performed automatically by another piece of code, and this is the arrangement used in the present embodiment). Requisition retrieves the data from one of the related repositories or returns null, and finally the management interface allows for the addition/removal of critical components within the LRC. The details of these three components are described in the following sub-sections.

Instrumentation

The LRC has a singular role, to broker classes when a class cannot be located or a user-specified failure occurs. In order to do this, the class running has to know to 'talk' to the LRC itself in order request the new class, however asking the user to do this is unreasonable, and may need to be applied retroactively to classes, not to mention it is very much deployment-specific. In order to avoid this, the code needs to be added during runtime. This means no simple addition, but rather complex analysis of the code of every class loaded.

The amount of time that it takes to evaluate a class' methods and see if it contains the exceptions that the LRC has been configured to pick up, is obviously dependant upon the amount of methods, and size of the class. However, in all cases the time spent analysing a class to find a set of components or classes (bear in mind that it is byte code not source code at this stage), is unacceptably long and would massively prolong periods of class loading. However the Instrumentation class provides a more intelligent alternative; the class does have to be loaded fast, and the class also has to be checked, but they don't necessarily have to happen at the same time.

The Instrumentation interface defines not only the ability to define classes, but also the capability to redefine them. Using this technique it would be possible to return immediately from an Instrumentation interruption, whilst continuing the code analysis in the background. When the code analysis completes, if Instrumentation is needed then it is constructed and a class redefinition is called.

The method of redefinition is itself dangerous, with the high probability that the class being loaded was being loaded for immediate use, in which case changing methodology may already be too late, or cause the JVM to stall whilst replacing a class type that is already in use. However, in this case, the LRC can again catch the resulting exception and interrupt the normal processing to enable the mistake to be handled correctly—although this will then cause an interruption, the service will not actually go down, only be interrupted somewhat.

The technical ability and precision needed for successful instrumentation of a class to use the LRC in all cases, and without changing the semantic flow of the code is a very complicated matter. For this reason this section of the document is somewhat exaggerated to show exactly what is needed to be involved in a human readable environment (the actual instrumentation will either be done in Java Byte code or a translated instruction set). All the possible problems that need to be overcome are also thoroughly documented in order to ensure that a person skilled in the art is fully enabled to implement the present invention upon reading this document.

The task of the identifying Instrumentation itself falls into one of two categories which are shown in listings "Listing LRC 1" and "Listing LRC 2" set out below. The Code can either contain the exception as a 'throws' clause, or catch the exception within the system and handle it in some user-defined manner. In either instance the LRC still needs to attempt to correct the problem, whilst preserving the state of the program.

Listing LRC 1

```
private static int mutex = 1;
public Object exampleMethod1(String loadClassName) throws
ClassNotFoundException
{|
    while(mutex == 0);
    mutex--;
    Object testObj = null;
    try{
        testObj = Class.forName(loadClassName).newInstance( );
    }catch(IllegalAccessException iae)
    {
        System.err.println("cannot instantiate class : "+loadClassName);
    }catch(InstantiationException ie)
    {
        System.err.println("cannot instantiate class : "+loadClassName);
    }
    mutex++;
    return testObj;
|}
```

Listing LRC 2

```
public boolean exampleMethod2(Context ctx){
    Class sup = null;
    try{
        sup = Class.forName("does.this.class.Exist");
        sup = sup.getSuperclass( );
    }
    catch(ClassNotFoundException cnfe)
    {
        sup=null;
    }
    if(sup == null || sup.getName( ).equals("does.this.class.Exist"))
        return false;
    else
        return true;
}
```

In the case of Listing LRC 1, the ClassNotFoundException that is buried within the depths of the body can be seen to be thrown in the top clause, meaning that it hasn't been caught within the body; however we do not know that there hasn't been an internal catch first and then an external throw, therefore we must have more knowledge of what is happening within the system. Listing 2.2 shows a method that catches the crucial exception itself, and then does an evaluation on the result, here a wrapping try and catch instrumentation would not only be useless, but break Java syntactical format.

Both examples have deeper logic-based problems that the LRC Instrumentation needs to overcome. Listing LRC 1 shows an instantiation within a critical region: if the LRC instruments a broad try and catch wrapper around the whole body of the method, it will run, fail at the class load, then in the catch block the LRC will be called, retrieve the class and then try to run the logic again. However, the semaphore is already held, so the class will infinitely iterate on the while loop, waiting for the resource. Likewise, Listing LRC 2 is designed to check that the super-class of a class is not itself (a known impossibility, but is designed to illustrate this point). Should the new instrumentation choose to take just the line that throws the exception then re-evaluate, it will have already passed the remains of the block, including the critical re-assignment, to the "sup" variable, and so end up deciding that the parent class of sup is "sup" and so return false.

In order to handle all eventualities, the LRC must in fact first locate the individual line that throws the critical exception and surround only it. This is the only way to ensure that the method will continue to process as expected upon class retrieval. In addition, the LRC must make sure that if an assignment happens on the 'critical' line that the variable is not declared at the same point, being rendered useless if this is the case. The desired equivalent syntax should be to move any components to the left of the critical call in a sequence chain onto the line above as an assignment and then continue the chain on the critical line. If a variable name is needed then it must be generated to make sure that within the context of the method it is completely unique.

Listing LRC 3

```
public void exampleMethod3( )
{
    String loadName = "com.name.super.package.Class";
    try{
        try{
            Class store = (Class)((new LRCDemo( )).getClass( ).
                getMethod("exampleMethod1",new Class[ ]
                {java.lang.String.class}).
                invoke(this,new Object[ ] {loadName}));
        }catch(InvocationTargetException ite){
            if (ite.getTargetException( ) instanceof ClassNotFoundException)
                throw (ClassNotFoundException)ite.getTargetException( );
            else
                throw ite;
        }
        // do further things with the retrieved class
        //...
    }catch(NoSuchMethodException nsme){
    }catch(InvocationTargetException ite){
    }catch(IllegalAccessException iae){
    }catch(ClassNotFoundException cnfe)
    {
    }
}
```

Listing LRC 4

```
try{
    try{
                              1. Seperate out assignment
        Class store = null;
        Method tempx14ha29 = (new LRCDemo( )) .getClass( ).
                getMethod("exampleMethod1", new Class[ ] (java.lang.String.class));
                        2. seperate out call chain to the left of    3. replace chain with generated
                        the critical call, assign to an arbitrary    placeholder to already calculated result
                        generated variable try{
            store = (Class)tempx14ha29.invoke(this, new Object[ ] (loadName));
        }catch(InvocationTargetException tempEx94817a)
        {                                              4. surround critical line for target exception,
                                                       generating arbitrary name for the exception
            if (tempEx94817a.getTargetException( ) instanceof ClassNotFoundException)
            {                                                    8. alteration to attempt
                String tempStr1048d = ((ClassNotFoundException)tempEx94817a.   to find target exception,
                    getTargetException( )) .getMessage( );                     if not --> throw
                //parse message for the fully qualified class that could not be found
                termpStr1048d = /*parse call goes here*/ tempStr1048d;  ——— 5. extract classname from trace
                LRC request goes here
                // ...                                         6. attempt to extract class from the
                //presume object loaded, if not this will just fail in   LRC's resources
                //exactly the same manner as before                     7. run critical line again
                store = (Class)tempx14ha29.invoke(this,new Object[ ] (loadName));
            }
            else
                throw tempX94817a;
        }
}
```

The final listings, Listing LRC 3 and Listing LRC 4, show how a very complicated tangle containing the target exception should be unravelled. The example method contains an overly long chain of operations that reflect the class, get 'exampleMethod1' and invoke it. The complications arise from the assignment at the start of the line, the cast required to pass to the object type, the long chain before the critical element and, perhaps the most convoluted of them all, the exception we are expecting is not actually thrown as the method is invoked through reflection.

As can be seen in Listing LRC 4, the way the LRC should instrument a mess such as illustrated in Listing LRC 3 is firstly by separating the line at the point that throws the target exception (taking the Exception as the Invocation target Exception at this stage, this will be covered later). Starting from the left hand side of the line the assignment must be separated out from the line, so as not to change the scoping this is shown in point 1. Then the function chain needs to be separated out from in front of the critical component, avoiding taking the cast with it. It is separated onto its own line and given its own random variable for allocation. This random variable then replaces the call function chain in the critical line.

The critical line is then wrapped with a try catch for the trigger exception. Inside the catch block the extraction of the name of the missing class is extracted by an LRC library routine (cycling back through the Stack Trace Elements using regular expression-based matching routines to find and extract the class name). The class is then used to invoke the LRC's retrieval component and finally the critical line is re-run.

The final complication with this component is the fact that the critical method is run by reflection, which by nature encapsulates all the exceptions thrown from the method at runtime. In order to handle such occurrences the LRC is instructed to always instrument on these classes. It uses a slightly different pattern in that it will separate and instrument on the class, and then immediately do an 'instanceof( )' within the catch to check to see if the target of the exception matches any of the specified intercept instructions. If it does, it handles this as before, otherwise it simply re-throws the exception.

Figure 5A:
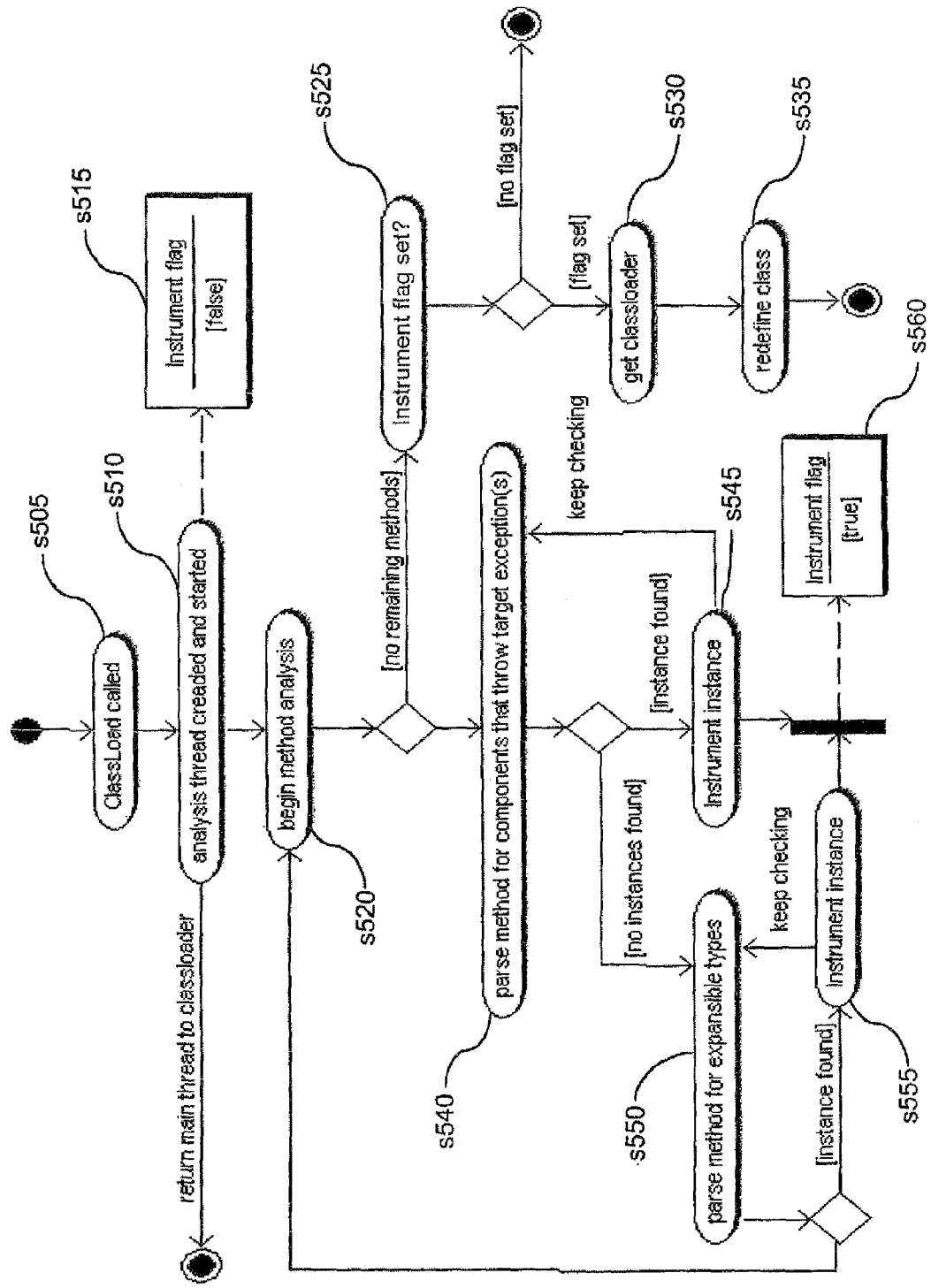
FIG. 5(a) is a flow chart illustrating the steps performed by the Load Recovery Component (LRC) of FIG. 1, upon detecting that a new Java class is being loaded, to ascertain if a redefinition of the class being loaded is required in order to enable the LRC to subsequently catch any ClassNotFoundExceptions (or other specified exceptions) and deal with them by retrieving the respective class from an appropriate source (such as the DCDR)

The logic for the instrumentation can be seen in FIG. 5(a), as can be seen, whenever a classLoad method is called (s505) an analysis thread is created and started (s510) for analysing the class being loaded, while the main thread then continues with its processing after finishing loading the class. When the analysis thread is initiated, an instrument flag is set as being false (s515). The analysis proper then begins on the newly loaded class (s520). Each method in the class is parsed for components that could throw one of the target exceptions (s540). Any such instances which are found are instrumented (s545)—as soon as such an instance is found and instrumented, the instrument flag is set to true (s560). Once all of the instances have been processed (or if no such instances are found in the first place) the method proceeds to step s550 where the method is parsed for expansible types and these are then checked to see if an instance requiring instrumentation is found in which case it is instrumented (at step s555—and the instrument flag will again be set to true if it has not already been set as such). The process continues to loop back to step s540 to check for new methods to be processed until there are no methods remaining whereupon the method proceeds to step s525 where it is checked whether or not the instrument flag has been set to true; if it has not the method simply ends. Otherwise, at step S530, the classLoader for the class in question is obtained and the redefined class is reloaded into the system (s535). Thus, step s540 first checks and handles all instances of the user specified classes. Upon finishing this iteration, the handler then moves (s550) for checking for expansible types. These are the types that may have nested their target exception within the thrown exception, masking the true exception from the LRC.

Another consideration the implementation needs to take into account is the real possibility that, through a series of function calls, the handler may be built into each call, meaning that in the event of a failure each call on the stack would individually go through the process or attempting to retrieve the class from the LRC. Given the ability for remote look-ups of the LRC, and the nature of re-running lines of code (which could be a whole series of nested function calls), the process of failure would become exceptionally expensive. Thus it is known that the exception should be handled on the highest point (peak) of the stack calls, in order to maintain applicability and then all subsequent classes ignore the call. Instrumentation cannot be based around the functional call hierarchy because it is not known, even at runtime, without overly extensive evaluation.

A more effective solution is to make sure that when LRC has already tried to handle a load and failed, that it tags the thrown exception so that subsequent attempts simply re-throw the exception rather than try to repeat the load recovery process.

The final consideration with the Instrumentation-based component is that the actual back end instrumentation utility chosen will effect how the Instrumentation and parsing of methods is effected. Using a utility such as BCEL allows the user to modify the byte code using conversion to equivalent, assembler style commands. However, a utility such as javaAssist goes much further and allows "users [to] use the source-level API, [so] they can edit a class file without knowledge of the specifications of the Java bytecode". This of course provides an extremely attractive, albeit slower method of performing the instrumentation.

Requisition

The Requisition component of the LRC comprises most of the run-time system; it contains the type of user exception, together with a retrieval class that contains a method of remote class fetching. These classes may be specified either at build time, or subsequently through either the management component or even through alteration via another logical component such as the Logic Replacement Unit (LRU). Each class must adhere to a requisition interface that has a single method, "getClass( )", that takes a fully qualified class name as a String parameter and returns a Class object. It is expected behaviour for implementations to have their own connection types such as a Dynamic Component Descriptor Repository (DCDR), URL class loader or another user defined service. These are transparent to the interface and are invoked from within the "getclass( )" method.

Figure 5B:
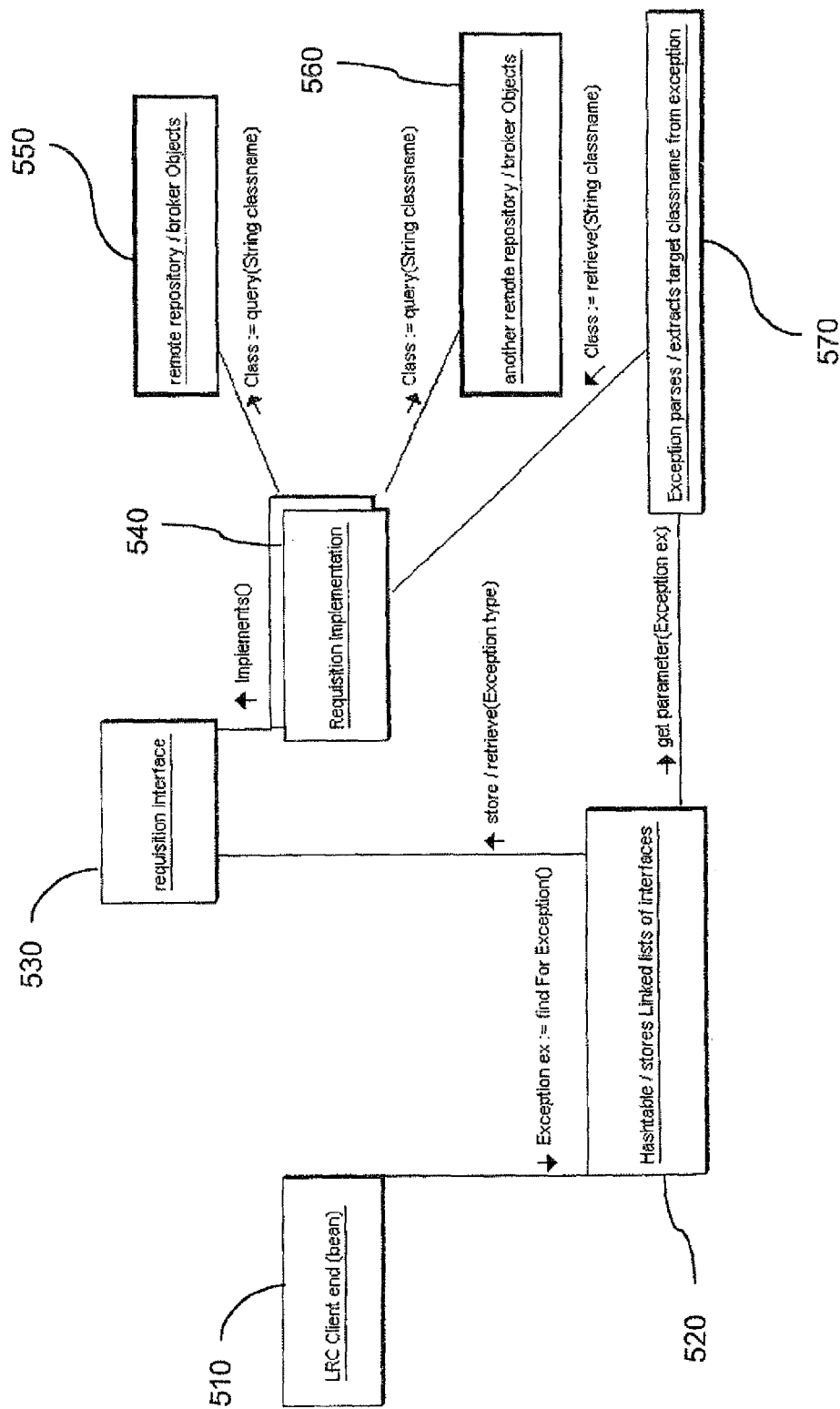
FIG. 5(b) is a schematic block diagram illustrating the components of the LRC involved in obtaining a class in the event of a ClassNotFoundException being caught.

The structure and call hierarchy of the Requisition front-end (the LRC Client end 510 which will take the form of a deployed Enterprise Java Bean), interface (this is a Hashtable 520 storing linked lists of suitable requisition interfaces 530, together with the requisition interfaces themselves 530) and implementations 540 can be seen below in FIG. 5(*b*), together some remote repositories 550, 560 from where the classes can be obtained (e.g. the DCDR) and a parsing module 570 which passes the target classname to the respective requisition implementation 540 having extracted this from a caught exception (passed to it from the Hashtable 520). Note that the core part of the system, the requisition component, is in fact very simple, with the complicated communication components all being handled in the requisition implementations 540.

Management

The final component of the LRC is a management interface that allows the brokering of new requisition Implementations, as well as new target exceptions and expansible extension types. The management interface should be easily accessible and writeable, and so a JMX based Mbean would be ideal. The Mbean simply has to have the getters and setters for each of these three types and finally an option to generate a report which summarises the configuration of the LRC as a simple text output of all the catching exceptions and where they are directed to.

Dynamic Object Capture Utility

Introduction

Modern Java Systems now allow for receiving of new types of classes that are handleable by super class, interface or via reflective invocation on the object itself. This allows a great deal of flexibility to the system with the provisioning of new logic or operations, and makes for very complicated but flexible systems. However there is a significant problem with using these dynamic classes and that is their transient nature.

With Remote Method Invocation (RMI) Objects can be passed as parameters if they implement the "serializable" interface. These serialised objects contain not only the data to represent the fields of the object but the actual class structure itself so that upon de-serialisation the Object is "ready to use" in whatever manner the receiving application can handle it. However the problem comes with then storing these objects; dynamic typed objects can only be stored by the highest know super-interface or super-object type. If the Object contained extra data that was not specified as a property of the super-type, this data will then be lost upon re-creation from the database as there is a high chance (increasing with time) that the dynamically received class will no longer be available to instantiate.

The more dynamic the actual system is, the more of a problem the aforementioned limitation becomes. This provides a serious problem for future generations of distributed Java programming. For instance, in a system that is using very high level, non specific interfaces, or a structure that via Introspection or reflection is capable of using all, non-previously defined, methods for an Object, the loss of such data on reconstruction can be fatal for the system itself, as well as the original client brokering the Object.

The problem is furthered by the nature of Java. Once a class has been loaded, the physical bytes that represent the class are lost; only the internal use structure remains in the Java Virtual Machine (JVM). This means that if a class is received and then perceived as being necessary for further (persistent) use, then it is already to late to try and store the class as only its internal (and proprietary, version specific) representation exists and there is no way of extracting the class bytes from the loaded class.

Analysis/Research

The fundamental problem is attaining the class bytes (class file as it appears in storage on disk) in order to save a copy of the class for further re-use. It is known that once a class has been loaded, the class bytes are unattainable. However, looking at the structure of the ClassLoader interface, there is a method that is called with the class bytes in order to load the class in the JVM. Therefore, there is at least one point in the loading process where the bytes are handled as regular file bytes outside of the JVM class structure.

Further research in the field shows that the JVM has handles for performance profiling tools. Profiling tools are for monitoring time or cycles taken for a class (or classes) to load, run, be reassigned, etc., and can be very important for performance critical or real-time systems. One of the methods that a profiling tool can use is actually putting new data in a class's method itself; i.e. to allow for hooks from the JVM into the profiling tool itself in order to generate statistics, time spent in loops etc. This process is called class instrumentation. To facilitate instrumentation, the JVM has a CLASS_LOAD_HOOK event which if enabled allows instrumentation of the class bytes loaded from the file system before they are processed into an actual class within the JVM. Since Java 5.0

(1.5.0), this hook ability, and indeed instrumentation itself, is now available within the Java runtime environment itself, rather than having to program in C using the Java Native Interface (JNI).

The mentioned Instrumentation technology enables the easy capture of bytes, however it does not facilitate their further use. There are two distinct goals for a corrective component such as the DOCU of the present embodiment to meet:
1. Capture classes that are not already within the system.
2. Store these classes for further use.

Design

The Dynamic Object Capture Utility (DOCU) has to have a specific instance for each application running on its server as it has to determine what classes it should be considering for interception and subsequent capture in terms of validity for an individual system. In order to do this, it is expected that the DOCU will be incorporated as an include JAR, or bean that is configured by a static block at the start of a Java Value Type (JVT) session bean, such that when an application is launched—s605—it calls the DOCU with its "getManagedEntityTypes" method (s610) which in turn causes a call to a DOCU component s615 as a means of determining which interfaces the interception needs to be actuated on. The "setManagedEntityTypes" method allows for additional types to added should such need arise.

Figure 6A:
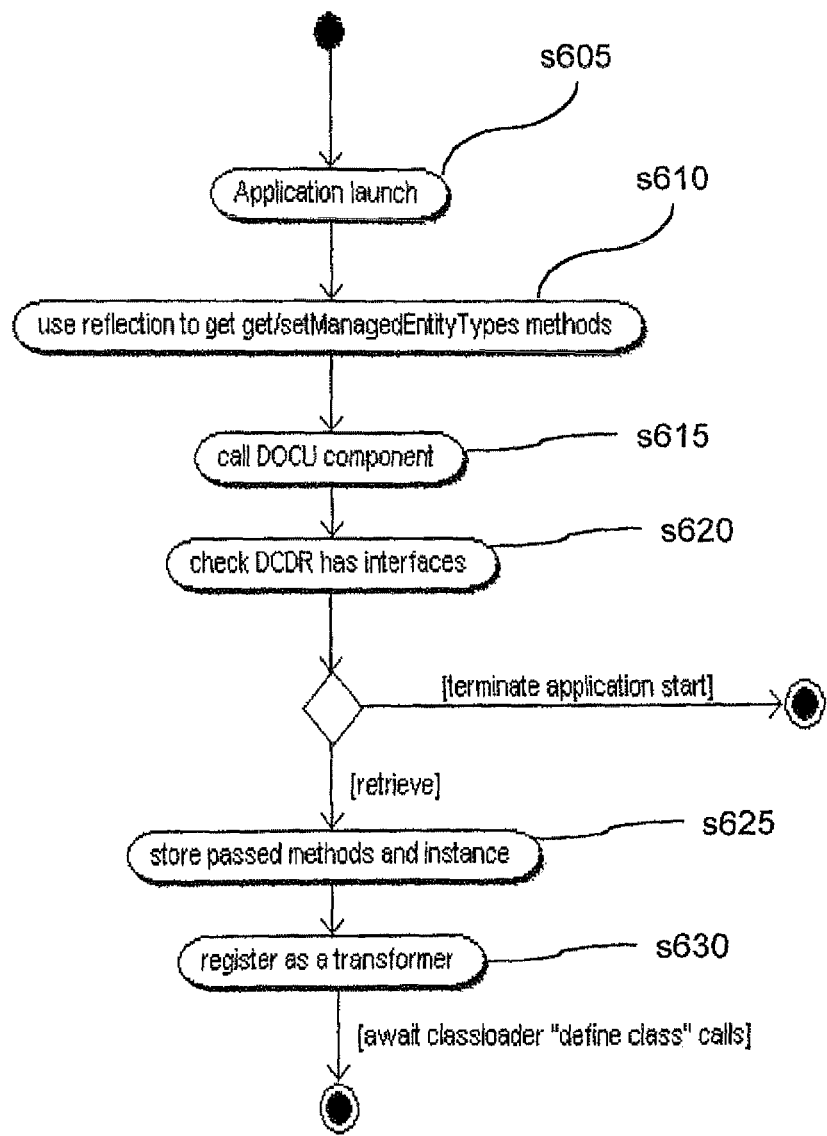
FIG. 6(a) is a flow chart showing the steps performed by the Dynamic Object Capture Utility component of FIG. 1 when a new instance of the DOCU is created for an application.
Figure 6B:
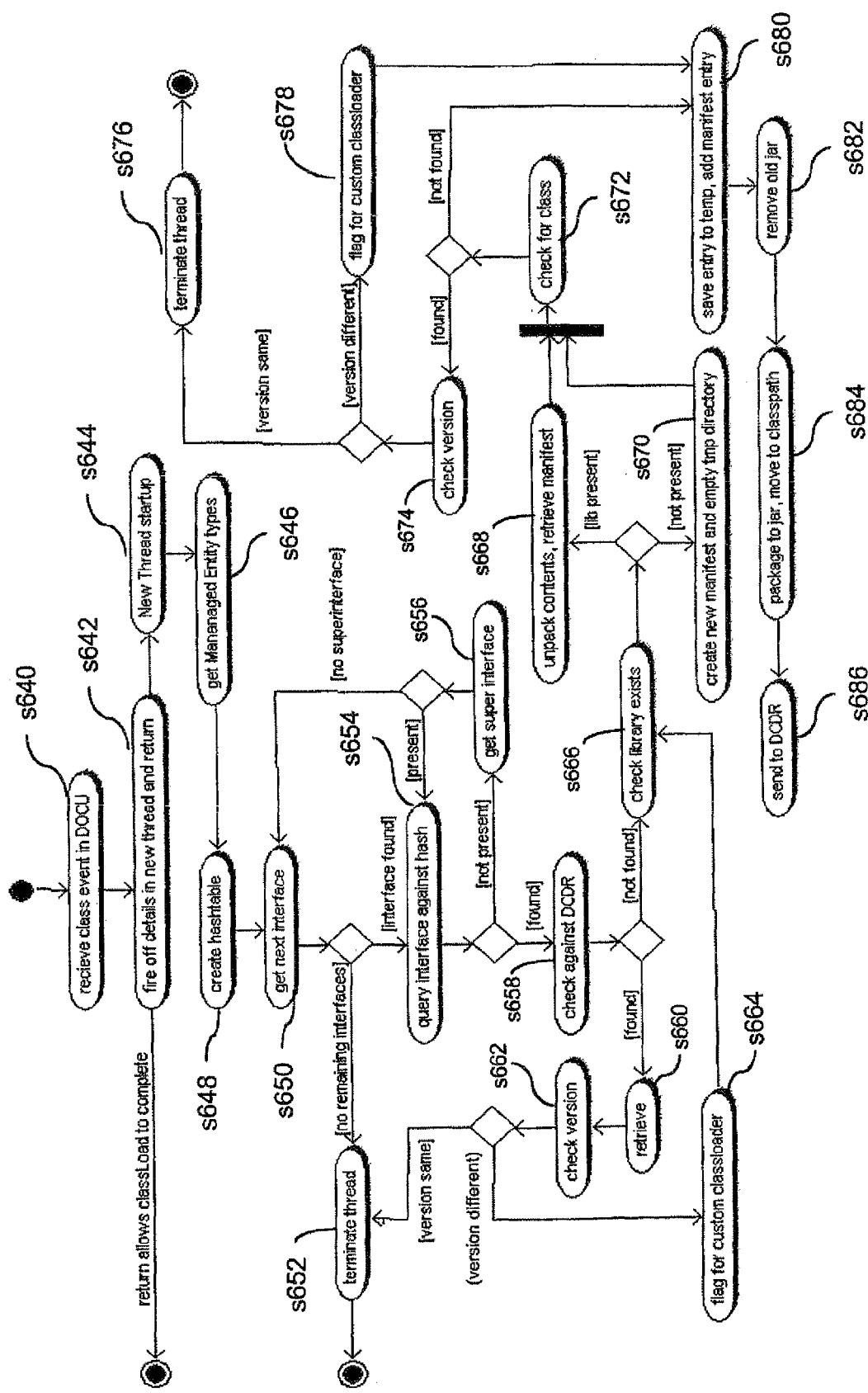
FIG. 6(b) is a flow chart showing the steps performed by a DOCU instance when receiving an object for use in the system.

The DOCU then requests (s620) the defined interfaces from the Dynamic Component Description Repository (DCDR) so that it can class match, rather than String match (if the DCDR does not have these interfaces the application start is terminated). Otherwise, upon load of the interface classes, the passed methods and the DOCU instance are stored (s625) and the DOCU then registers itself as 'ClassFileTransformer' (an interface that it must also implement) using the 'Instrument.addTransformer( )' method (s630). This logical process is illustrated in FIG. 6(a). Note that a new instance of DOCU is created for each and every service, otherwise filters could get confused between applications, and input types could be accidentally allowed for a system that prohibits them.

The operation of the DOCU itself is a little more complicated than its initialisation though relatively straightforward still. On receiving a class, the classloader is called and then has to defineClass. Due to the presence of the registered class file transformer, the class definition is postponed whilst the registered Instrumentation utility (DOCU) is called.

The DOCU doesn't want to slow down the process of class loading so its first immediate action, after receiving a class event (s640) is to fire its main decision body off as another thread and return immediately from the transform class method, in order to continue the class load (s642). In the new thread (started at s644) the DOCU then goes about handling the newly received class. Firstly the DOCU checks to see if the class is relevant to the application; it runs the getManagedEntityTypes method (s646) to get the String names for each super interface type that the system supports. This is done each time because the system is potentially going to be dynamic, therefore it is quite possible that the JVT bean that it was originally instantiated from has in fact been replaced (note: this is why the getManagedEntityTypes method is static, so an object instance is not required to run it).

Upon retrieving the system managed entity types, they are entered into a hashtable (s648) for easy indexing and then the comparisons can begin (s650 starts a loop "get next interface"—as soon as there are no more left, the thread is terminated at step s652) on the loading object. The class type hierarchy first needs to be extracted from the new object, first by checking the implemented interfaces (s654), then for each of these interfaces matching back by getting the super interface recursively (s656), until a match occurs or the super class is returned as null. If no matching super class can be found then the thread simply terminates (s652).

With the super class/interface found, the next process is to find whether it exists within the scope of the system. The thread contacts the DCDR (s658) with a request for the class in order to see if a version of the class already exists. In the event that it does, it is retrieved (s660) and compared to the class being loaded (s662). In the event that it is the same the thread is simply terminated (s652). In the event that it is not the same, a new external version of the class is presumed and so will proceed as if the class does not yet exist, using a different class loader (flag for custom class-loader s664) and the lowest available level interface (sub interface) to refer to it and then the method proceeds to step s666.

In the event of a new class to the DCDR determined at step s658 (or a new version determined at s662), the DOCU must check firstly if it has a local library of classes exists (s666), if it does it unpacks the contents and retrieves the manifest (s668), otherwise it creates a new manifest and empties the temporary directory (s670); in either case, it then checks (s672) it to see if it contains the class (very unlikely if the DCDR does not have a copy, but potentially plausible). In the unlikely event that the local library already has the class, then it should be immediately persisted to the DCDR and then appraised to see once again if the class being loaded is a different version (s674). If the version is different then it should also be sent to the DCDR at this stage, being flagged as a new external version and proceed to load with a different classloader (s678). If the version is the same then the thread is simply terminated (s676).

The final possible situation is that the library exists (or needs to be created), but does not contain the newly received class. In this instance the new class is saved to disk and added to the library as well as being dispatched to the DCDR (s680). An important note is that the addition to a library file is not a simple add, as the Java API only supports creation, reading and destruction of jar files, therefore the current contents have to be unpacked to a temporary directory (s682), new contents written in, the manifest updated and then all packaged back up into the jar again (s684), and then this is sent to the DCDR (s686). This entire decision making process is outlined in FIG. 6(b).

Note that in some stages, the class transfer to the local library will not happen. This would imply that the dynamic program (if being used in a dynamic context) could potentially get to a situation where the class is not loaded and not available in the local library. The Load Recovery Component (LRC) is designed to fetch components during runtime in order to alleviate this problem. Although at the developers discretion the system library could be ensured within this component.

Dynamic XML Object Handler

Introduction

Enterprise Java Beans (EJBs) are a part of the Java Enterprise Edition (Java EE) specification. EJBs are server-side system components, which enable distributed applications within a Java EE environment. One type of EJB is the Message-Driven Bean (MDB). MDBs are server-side applications which are not directly accessed. Instead, interaction is via one or more messaging queues.

Figure 7A:
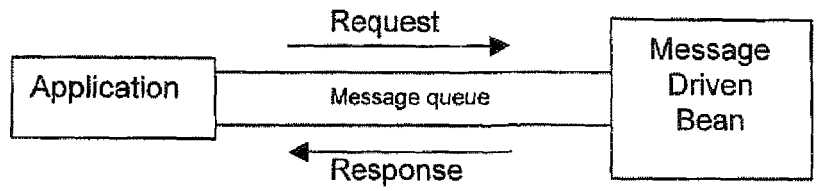
FIG. 7(a) is a schematic block diagram illustrating a message queue used for passing messages between a message driven bean and an application.

FIG. 7(a) illustrates a message driven architecture where a (remote) application and an MDB exchange messages with one another over a message queue.

When an MDB receives a message, it performs an action based upon that message. The response is then returned using the queue specified in the message's 'replyTo' method. The use of a message queue enables asynchronous communication; the application can submit a request at any time, and the MDB can deal with it when appropriate (and vice versa).

These messages can be of two different types: object or text. Object messages are Java specific messages which carry a Java object. The other type, Text messages, contain a purely textual payload. For any action to be performed upon the contents of a text-based message, it is desirable for there to be a way of extracting useful data from the message, and any related information about that data (meta-data). Using XML, it is possible to encapsulate both data and meta-data into one document, which can then be used as the payload of a Text message. Within Java, a mapping can be devised to convert Objects into a textual format, by extracting the values of fields and storing them within an XML document. These documents can then be sent as text messages and reconstructed remotely, with an MDB performing actions based upon the re-constructed objects.

For this conversion to occur, it is necessary for both the application and the MDB to have the object classes before any messages are sent. For a dynamic system, however, this is not always feasible, as new components, bringing new object types, can be added into the system at any time.

System Design

Converting XML to Java Objects

Figure 7B:
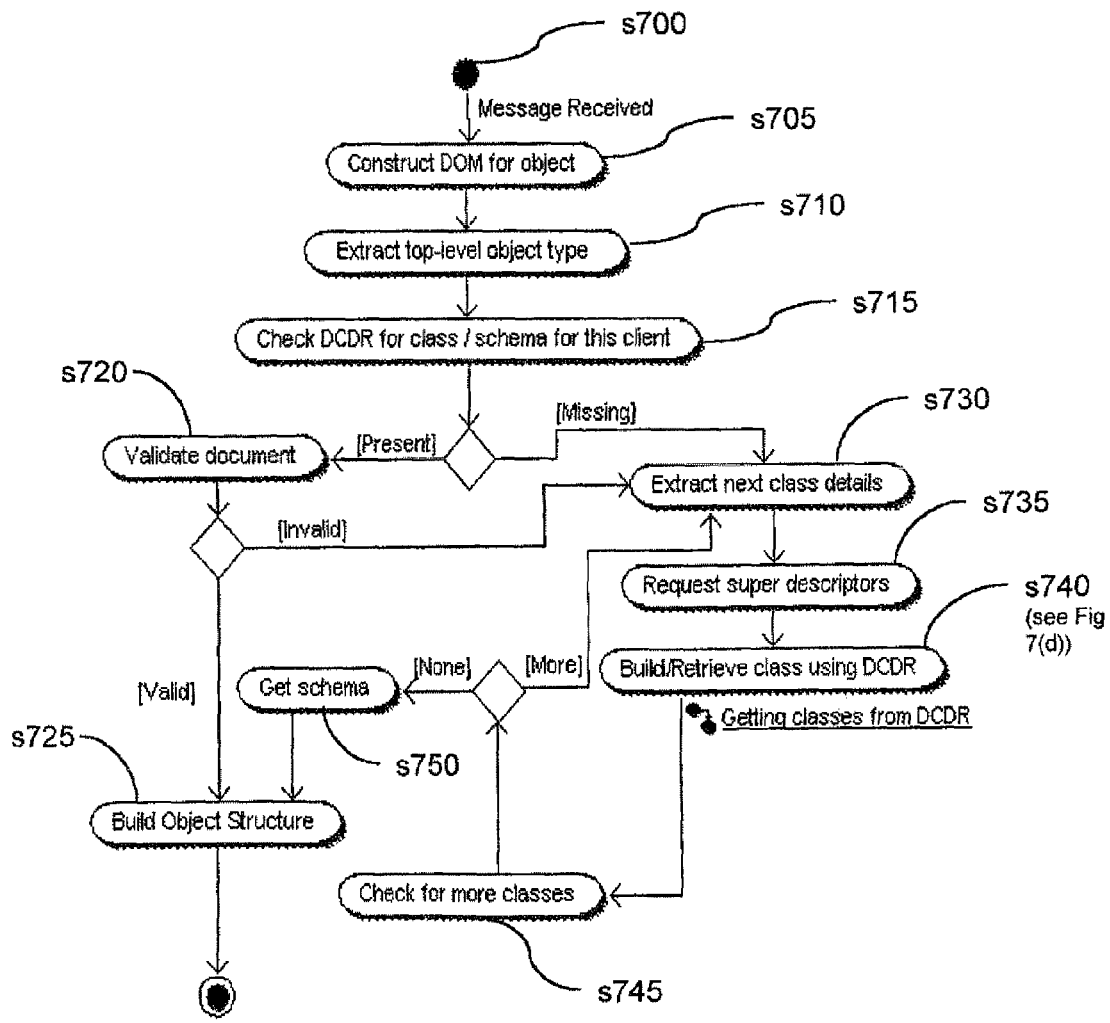
FIG. 7(b) is a flowchart showing the steps performed by the Dynamic XML Object Handler (DXOH) component when receiving an XML message representing an object to be introduced into the system.

The fundamental feature of this system is the conversion of an XML representation of an object to that object. To do this, it is necessary to ensure that the classes for those objects are available. The first stage, after receipt of a message (s700 in FIG. 7(b), is to extract from the document the class details of the top level object. To facilitate this, a Document Object Model (DOM) can be constructed (s705). A DOM is a tree-based representation of all the elements within an XML document. By traversing this tree it is possible to extract all the names, attributes and values for each and every (sub-)element.

Required for class type extraction are: the element name (this maps to the Java class name); the "extends" and "implements" attributes (these are used to maintain class hierarchy); and the package name (which ensures the correct class is used).

In the present embodiment, an iterative process is used to traverse the DOM tree and process each class/schema as it is extracted. Thus, when the top-level object type has been extracted (s710), the Dynamic Component Description Repository (DCDR) can be queried (s715), to see if an XML message of this type has been previously received from this client. If it has, the validation schema can be retrieved. By validating the document against this schema (s720), it can quickly be determined whether the structure described matches the currently held object types. If it does, the document can quickly be converted (i.e. the corresponding object structure may be built—s725) with no further issue. If the validation fails, or the schema is not present, the class structures will have to be retrieved from the remote application bringing the system inline with the remote data structures. This involves extracting class details including interfaces implemented and super-classes extended (s730), requesting the (or further) super descriptors from the remote source (s735) and building the class and/or retrieving the class from the DCDR (s740) and reiterating these steps for each relied upon class (e.g. super-classes) that needs to be built (s745). Upon completion of the iteration the schema for the classes are obtained (s750) and then the method proceeds to step s725 where the object is finally built as before. Once the structures match the document, a simple mapping can be performed, setting the attributes of the representing objects.

XML Message Structure

Due to the purely textual nature of XML, it is only possible to transfer simple data types, and not business logic. As such, all data encapsulated within this XML-based transfer is attribute-based. Each attribute will have a 'get' method, and a 'set' method, to allow for interaction and processing.

To convert between an XML document and an Object, and vice versa, it is necessary either for a mapping to exist, detailing the correlation of elements within the XML to the fields within the object, or for the document to follow a set of naming and format conventions, allowing a generic mapping to be performed.

For a dynamic system, it is likely that a set mapping will not be present upon the remote system, requiring on-the-fly generation. It is far simpler, therefore, for the generic mapping method to be used. The conventions and rules are outlined below.

XML-Based Messages Must Adhere to the Following Rules and Constraints in the Present Embodiment:

All objects must include the DXOH-Message namespace. In the present embodiment this is located at 'http://www.bt-.com/namespace/dxoh/message', the DXOH-Message namespace defines the "implements" and "extends" attributes, as well as the top-level elements "method" and "object", used to indicate the class hierarchy and the form of the message respectively.

The root element must be a message element, within the DXOH-Message namespace.

If the message is calling a method, the message must contain the methodName attribute, whose value must be the name of a method that the MDB is capable of calling. If this attribute is not included, then the MDB is to perform an action based upon the first object (i.e. the sub-element of the message element).

If the message is calling a method, then each direct sub-element of the message element must comprise an ordered list of method arguments, each of a valid argument type.

If the message is not calling a method, there must be only 1 direct sub-element of the message element.

All class names must include the full package name. Thus <ExampleClass> becomes <com.bt.ExampleClass>. This ensures that any class generation is targeted to the correct java package. The only exception to this is for the Java primitive types, including String; int, boolean, double etc.

Arrays must be signified by including the setting the 'array' attribute of the DXOH-Message namespace to 'yes'. Each element of the array is indicated by 'item' tags, also from the DXOH-Message namespace, rather than individually class-named elements.

Any sub-element of an element representing an object represents an attribute of that object. That attribute can be accessed by get and/or set methods named by capitalising the first letter of the method element, and prefixing with 'get' or 'set' as appropriate. The return type of the 'get' method, and the single argument type of the 'set' method is the name of the sub-element.

Any method element may contain only one direct sub-element.

Whilst it is required for the first instance of any object type within the message to include the extends and implements attributes where appropriate, for any further occurrences, this is purely optional. This includes situations where there is a mix of arrays and singular objects for a type.

Listing DXOH 1 "Sample XML document" is a sample XML message which conforms to these rules. It specifies a method 'testMethod' to be called, passing as an argument an array of type 'testClass1' from the package 'my.test.package'. There are two elements within the array, each with a 'string' attribute called 'attributeA'. The values of this attribute are 'Test1' and 'Test2' respectively.

Listing DXOH 1

```
<?xml version="1.0"?>
<dxoh:message dxoh:methodName="testMethod"
  xmlns:dxoh="http://www.bt.com/namespace/dxoh/message">
  <my.test.package.testClass1
    dxoh:array="yes"
    dxoh:implements="my.test.package.testClass2"
    dxoh:extends="my.test.package.testClass3">
    <dxoh:item>
      <attributeA>
        <String>Test1</String>
      </attributeA>
    </dxoh:item>
    <dxoh:item>
      <attributeA>
        <String>Test2</String>
      </attributeA>
    </dxoh:item>
  </my.test.package.testClass1>
</dxoh:method>
```

XML Class Broker
Overview

Figure 7C:
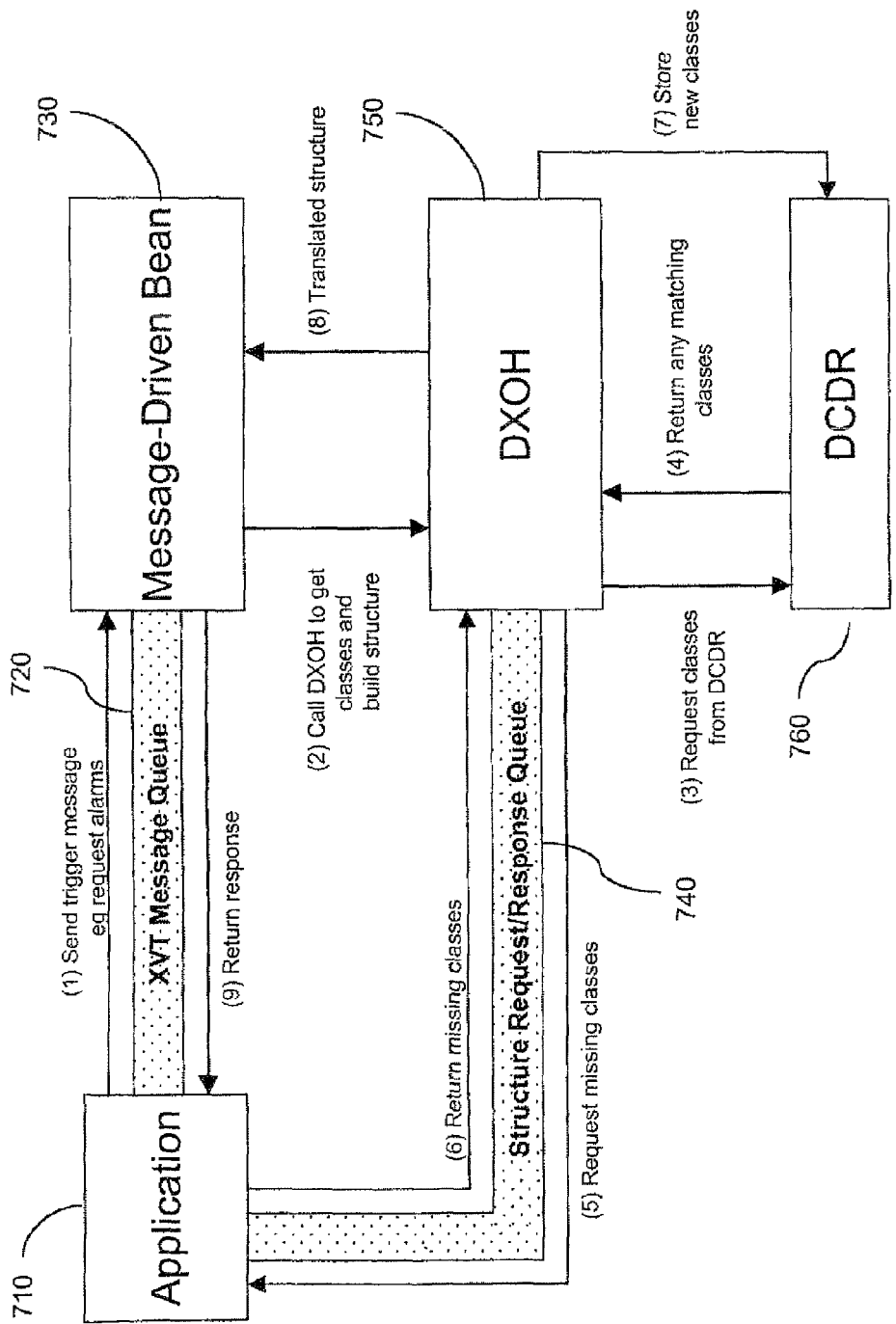
FIG. 7(c) is a schematic block diagram illustrating some of the components of the system including the DXOH involved in processing a received XML message representing an object.

FIG. 7(c) shows how when an application (710) sends a trigger message (message 1) (e.g. including an XML representation of an object) via a message queue 720 to an MDB 730 within the server framework 100, the MDB calls the DXOH 750 (message 2) to get the corresponding classes and build the necessary structure. The DXOH firstly requests these from the DCDR (message 3) and the DCDR returns all of the ones which it has (message 4). If any classes are missing, then the DXOH contacts the application via message queue 740 requesting the missing classes directly from the application (message 5). The application 710 then passes the missing classes back to the DXOH via the message queue 740 as XML representations of these. Finally the DXOH builds the appropriate classes from these XML messages and then sends all of the information to the DCDR 760 (message 7) so it can store these classes for future use. In summary therefore, if schema validation fails, the DXHO will request the classes from the application via a message queue. These classes will be returned via the same queue.

The XCB uses a standard message queue, the same as used in the MDB communications. The messages sent/received are also formatted in XML. Classes are requested explicitly by name, and only those requested are returned. This is opposed to the entire hierarchy being returned. The exception to this is the inclusion of a request for the complete hierarchy of a class, designed to reduce message overhead when all super-classes are known to be required.

Document Request Structure

To request one or more classes via the XCB message queue, a common format has to be used, to ensure that both ends can translate both requests and responses. For a request, there is very little data to encapsulate; the name of the class (es) being requested, an identifier for the client the classes are required from, and whether the hierarchy is to be returned.

Listing DXOH 2 "A sample class request"

```
<?xml version="1.0"?>
<classrequest target="identifier"
  xmlns="http://www.bt.com/namespace/dxoh/xcbrequest">
  <class name="my.package.Class1" hierarchy="true" />
```

Listing DXOH 2 "A sample class request" -continued

```
  <class name="my.package.Class2" />
</classrequest>
```

As evident in Listing DXOH 2 (above), this type of message also has its own namespace, similar to the XML-object messages. This namespace defines all tags within this document, although it has been declared the default namespace in this listing for clarity.

For every class to be requested, there is a corresponding <class> tag, all within the top-level <classrequest> tag. The <classrequest> must have one attribute, the target attribute, whose value is an identifier for the original XML-object message. All JMS messages carry a property called JMSCorrelationID. This is either an application or message-specific identifier, is a String value, and its contents are system implementation specific. However, this value can be used for the target attribute, allowing all XCB messages to use the same message queue.

There may be any number (greater than zero) of <class> tags, with each including as a minimum the name attribute. If the hierarchy attribute is set to anything other then 'yes', or is not included, then only the requested class will be returned. Even with the hierarchy attribute set, any interfaces residing within the standard Java packages will not be returned.

Document Response Structure

Each response document's basic structure is similar to the request message. The first difference is the namespace. This now directs to the response, rather than request, namespace. The class tags no longer have the hierarchy attribute, but the name attribute is as before. If the class is itself an interface, the extra attribute interface must be set to 'yes' as can be seen in Listing DXOH 3. If this attribute is missing, or set to any other value, the <class> element does not represent an interface.

Listing DXOH 3 "Sample XCB Response Structure"

```
<?xml version="1.0"?>
<classrequest target="identifier"
  xmlns="http://www.bt.com/namespace/dxoh/xcbresponse">
  <class name="my.package.Class1"></class>
  <class name="my.package.Class2" interface="yes">
  </class>
</classrequest>
```

Interfaces and Extensions

Within the <class> tags, separate <implements> and <extends> tags describe the direct ascendants of that class within the hierarchy. The name of the class, including package name, is included as the value of the element, as illustrated in Listing DXOH 4. For Java-related reasons, a maximum of one <extends> tag may be included, but there is no such limit upon the number of implemented interfaces. If an interface is being described, no <implements> tags may exist, but there is no limit upon the extensions.

Listing DXOH 4 "Sample Interface/extension code"

```
<class name="TestClass1">
  <implements>TestClass2</implements>
  <implements>TestClass3</implements>
  <extends>TestClass4</extends>
</class>
```

Fields

Each class can include fields; variables declared public, static and final. In XML these are represented with the name, type and value. See Listing DXOH 5 for an example. This describes a field 'MY_FIELD', of type 'String', with a value of 'test'.

Listing DXOH 5 "Sample field descriptor"

<field name="MY_FIELD" type="String">test</field>

Every attribute with a get or set method, must have a corresponding field. The attribute names are converted to field names in the conventional fashion of inserting underscore (_) characters before any capitalised letter, and converting the whole string to uppercase.

Methods

Methods are the most complex of elements within a class, however their representation is limited by restrictions placed upon the system. Only attribute access methods are permitted, so only 'get' and 'set' methods need be represented. As these are very simple methods, only the attribute they represent will be modelled in the XML, and the target system (i.e. the DXOH) must be capable generating the necessary methods. As can be seen in Listing DXOH 6, the type of method (get, set) need only be prefixed to the name attribute, the capitalisation must be preserved.

Listing DXOH 6

<attribute name="MyAttribute" type="String" />

Building Classes

Figure 7D:
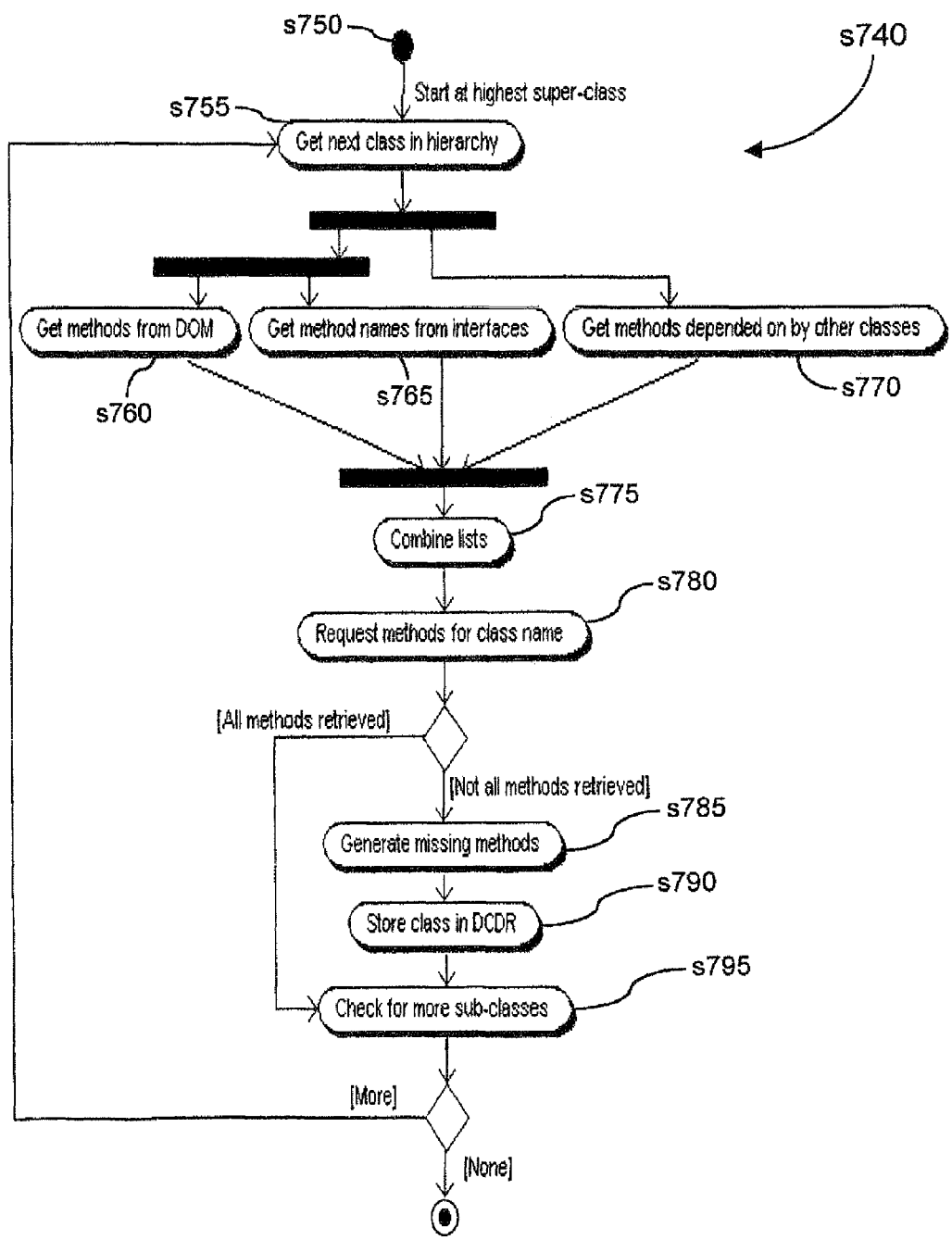
FIG. 7(d) is a flowchart showing the sub-steps performed by the DXOH (and the DCDR) to perform the step "Build/Retrieve Class using DCDR" of FIG. 7(b)

Referring now to FIG. 7(d), when at step s740 of FIG. 7(b), it has been established that a class needs to be generated, and all super-classes have been retrieved, a recursive process occurs. For each class (s755), starting at the highest (s750), a list of all methods required is compiled, based upon those attributes included in the XML, and those specified in an interface (steps s760, s765, s770) and these are combined at step s775. The DCDR is then called, requesting a class with the same name, super-interfaces and super-classes (s780). If a matching object is found, this is then used and the next iteration is carried out (s795), saving time on code generation. If a matching class could not be found, one must be generated (s785).

The code generation (s785) is largely uncomplicated, due to the attribute-based nature of the classes. For each attribute, a 'get' and 'set' method must be generated, returning and taking as an argument respectively, an object of the attribute's type. Any fields specified in the descriptors returned must also be included, using a direct mapping of name, type and value.

Once the code has been generated, it is sent to the DCDR (s790), where compilation and schema generation occur. Once complete, the next class is processed until all structures are present.

Dynamic Development Environment

Introduction

The Dynamic Development Environment is a Java development environment with integrated compiler and runtime environment, conforming to the stereotype of a modern Integrated Development Environment (IDE). A modern IDE will quickly compile the code, offer syntax highlighting in order to illustrate errors in the source, and manage imported header files for the user, as well as a wide range of further convenient functions.

Despite everything an IDE can offer, it is fundamentally restricted to interaction through source code; it can only base errors and warnings upon the syntax of the source itself. It is an oft-held opinion that achieving compilation is a minor issue, when compared to the more complex problems arising from business logic violations, invalid field ranges and code written without proper flow control.

The closest an IDE can come to validating a new class against business logic is by running the old logic in debug mode. Then by calling, passing or invoking the new business logic, the applicability can first be evaluated in Boolean terms; does the system encounter an error? In the case of error, further scrutiny is possible by stepping through a further time in order to try and establish the root cause of the failure. This is an effective form of debugging and works well for testing stand-alone systems, however for distributed systems the effectiveness of this technique is weakened in the following manners:

1. The source code cannot always be located for the business logic itself (especially when testing against real, deployed, business logic) this means that the debugging switches to a "black-box" approach, and the output stack trace from a deployed Java (JAVA EE especially) environment can be lengthy and obscure.

2. The source code for the system could be out of date, especially in the case of a dynamic system. This can lead to misleading debugging that can obfuscate the true problem.

3. The IDE cannot debug a remote service or server, unless debugging stubs are deployed, leading to a fully blind black-box test with the same lack of source code issues as discussed in point 1 above.

The more distributed or dynamic the system; the more these weaknesses become apparent, with less information provided to the developer.

Furthermore, the lack of specifications, or "accepted" interfaces (interfaces process-able by another class) can make even the process of starting to write a class an intimidating challenge as well. Not knowing which types of object can be used within a specific instance of a system leads to initial testing of a "blind" object, though the object may simply return an "interface not supported" exception. For these reasons the decision was made to develop a new approach to class design, which supports the development of components for distributed and dynamic systems.

Analysis of Problems

From studying the process of creating new classes for an extensible distributed system, or fully dynamic system, a list of failings and area's for improvement can be drawn up. These can be put formally as the following seven specification requirements, in addition to the standard design requirements of an IDE:

(1) Ability to interact directly with a remote system. This means that the service should conform to dependencies {1} and {2} (see below for dependencies).

(2) Ability to query the system in order to locate all supported types and generate a new class based upon a selected approved template {1}.

(3) Changes made should compile and automatically be checked against the system to validate business logic.

(4) Business logic errors must be displayed with viewable root cause much like syntax errors in a standard IDE.

(5) Automatic import access should also have automatic access to every key component's source within the system (real time source versioning) {3}.

(6) The DDE needs to be able to update system components and class types so that a distributed system can be improved and debugged on-the-fly, rather than a new build and release having to be issued.

(7) The DDE also needs to act as a portal for the health of the system as a whole, meaning that not only should it be able to update the business logic, but also roll back to earlier proven versions of components and resolve synchronisation and compatibility errors with classes created externally to the dynamic system space as a whole (i.e. through a B2B interface).

Dependencies

In order for the proposed DDE to achieve the seven defined specification requirements (set out above) there are four key dependencies that need to be fulfilled, these are as follows:

{1} The remote system, must be designed to support a "get-ManagedEntityTypes" public method.

{2} For real-time substitution or replacement of business logic there needs to be an instance of a Logic Replacement Utility in order to provide a smooth and down-time free replacement.

{3} In order to properly archive versions and acceptable classes in the system a Dynamic Component Description Repository must be provided within the visible system scope.

{4} The system needs to provide a suitable B2B interface type that will receive the new classes and allow for queries and operations to be run remotely. There are two dynamically enabled interfaces a JVT based Dynamic Object Capture Utility and a Dynamic XML Object Handler which provide ensured B2B services Design The premise of this design is that an IDE already exists and that the DDE is being built as an extension or an Eclipse-style plug-in. Writing the DDE from scratch would present the developers with the opportunity to build the DDE extensions into the core of the system. This is not essential and would considerably extend the project design and development time.

Regarding the traditional IDE as the core component of the DDE, extra components can then be built around the IDE in order to augment the IDE to fulfil the specification for a DDE.

Figure 8A:
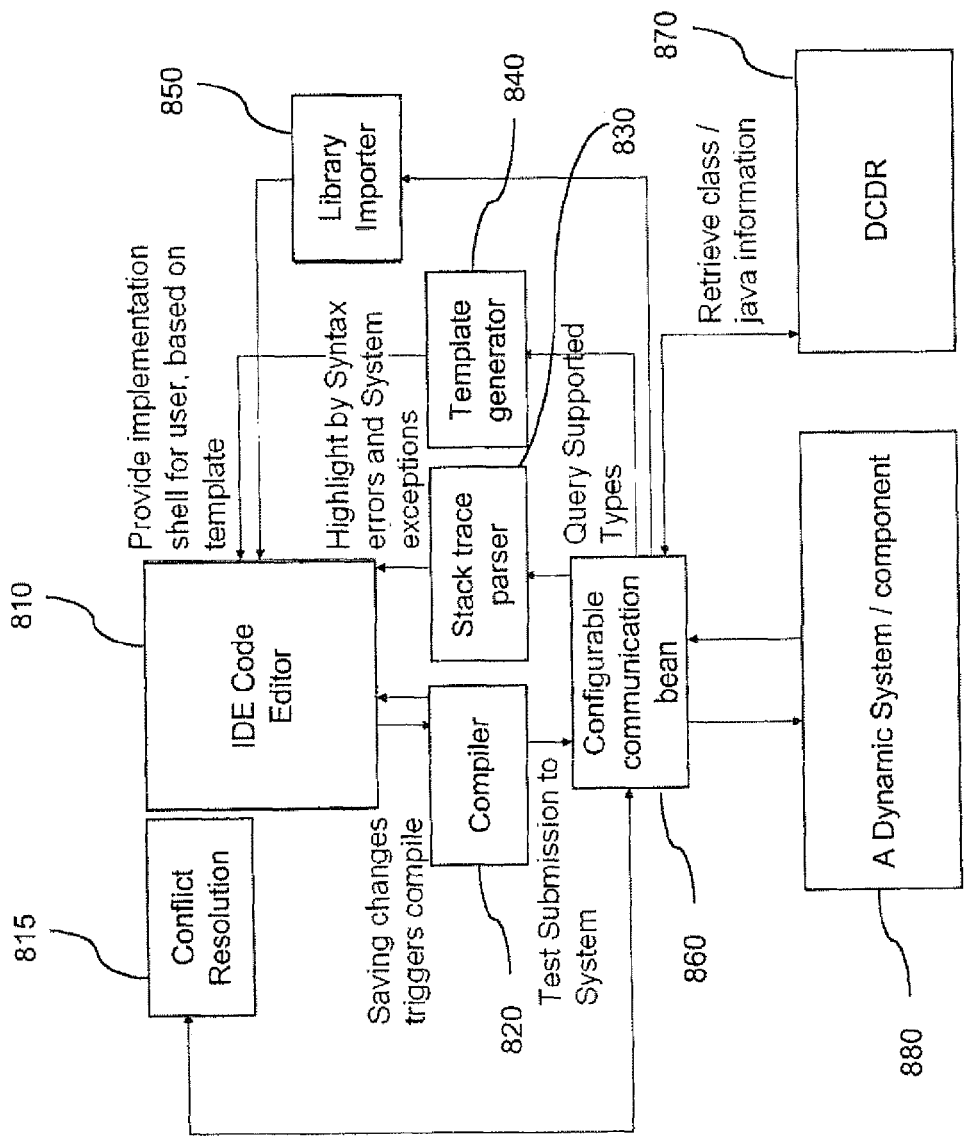
FIG. 8(a) is a block diagram illustrating the main sub-components of the Dynamic Development Environment of FIG. 1 together with the DCDR and a dynamic system/component interacting with the DDE.

Referring now to FIGS. 8(a) and 8(b), the following sections describe the components illustrated in FIG. 8(a).

Configurable Communications Bean 860

The communications bean is critical in enabling the DDE (810, 815, 820, 830, 840, 850) to administer the system and allow development of new classes. It connects to the dynamic system 880,14, the system's JAVA EE environment itself 10 (with a Logic Replacement Utility (LRU) 30 running from server start-up) and the Dynamic Component Description Repository (DCDR) 870,20.

Connecting to the system should be through the B2B interfaces 12 that must be provided on a dynamic (and distributed) system. However these B2B interfaces must be able to cope with newly created (dynamic) classes and so need to be more complex than simple beans or message driven beans.

The connection to the DCDR will be exclusively Java Value Type (JVT) based. Retrieving Class, Schema and source objects from the DCDR is a large and expensive process, and converting the data to XML format and then de-marshalling on the other side is a needless further expense. Although the DDE will be locked until the end of the transfer, the system cannot progress until the relevant supporting components are received, so performance of the system will not be adversely affected.

The connection to the LRU is important for updates to the business logic of the dynamic system, because the business logic itself has the potential to be changed. This direct connection to the server is needed for transactional updating of the logic.

The final communication managed is a "listener" bean 860 which allows for the receipt of update messages from the DCDR. These messages can be sent for one of two reasons: When a checked out resource has been updated from another source (i.e. to ensure that the developer is always developing for the most up-to-date version of an interface), or modifying the correct business logic version.

The DDE also has an asynchronous conflict resolution message receiver module 815 for receiving conflict resolution messages via the communications bean 860 since the DDE is for the administration of the system and so it must be able to handle conflict resolution messages.

The communications bean 860 is an easy to configure MBean or EJB which can send and receive information to and from the target system, target LRU and DCDR. Its communication types include at least XML over JMS (XVT) and RMI based bean access (Java Value Type access) using RMI exclusively for the DCDR and LRU communications. The communication type is selected by listening on both XVT and RMI connections, and responding using the method of the call. If broadcasting when not as a response then it is preferential to use XVT because it is asynchronous and so will not lock the communicating processes waiting for an acknowledgement.

Stack Trace Parser

The stack trace parser component 830 is an analytical agent that uses a large JAVA EE stack trace in order to provide "best illustrative root cause" analysis that is then illustrated on the displayed source code in the same manner as syntax errors are highlighted (both in the DDE and in conventional IDE's).

The parser works by getting all the stack trace elements and moving through them until it finds the point of failure in the user's code (i.e. in the users defined business logic). If no related element is found it means that the user created object is operationally correct but has violated a constraint in its composition, in this case the root causes are extracted from the Throwable and passed for the class file name. The root exception at this level then becomes the notation of the exception and the user's source is marked as erroneous at the initial class declaration header. It is also possible however that the dynamic system is using interfaces rather than reflection to get the methods of the class. To allow for this case the root cause analysis not only searches for the user's class but also checks the implemented interface tree's interface names in order to gain the root cause exception for highlighting.

Start-Up/Settings Configuration Utility (Not Shown)

Upon starting the DDE, connections need to be made to the server, the service and the DCDR ((1) in FIG. 8(b)—see also the lines connecting the DDE to these components, the connection to the service going via the DOCU 60). The first time the DDE is started it will prompt for a resolvable address to a DCDR and the address of a Logic Replacement Unit. Authentication would be a prudent step to logging into both of these facilities as the DDE has full access to a potentially critical dynamic system and can easily introduce errors into them.

The DDE then queries the DCDR for a list of B2B interface types and classes that it can look to pass standard non-business logic objects to, and presents these as a selectable list (these act like workspace domains do in a standard IDE) as well as present the option to create a new B2B Object (it should be possible to dynamically create a whole new JAVA EE based service from scratch, starting with the B2B interface and then expanding to other logical constructs, without the need to ever un-deploy or restart the server).

The DCDR and LRU settings should be cached upon being set the first time, and would display already in the fields for simple confirmation, upon running the DDE again. This would not prevent the user from specifying new settings.

Class Request Handler (Not Shown)

The Class request handler is used for following stack traces into the business logic. In the event that a developer creates a class which causes an unexplainable stack trace, then he/she will want to follow the trace into the business logic itself. The class request handler is invoked when a client wants to retrieve the java/class file relating to the stack trace and should work transparently in the background.

When a user tries to follow a link or open a declaration the class request handler should be invoked with the resolved fully qualified object name. It will then invoke the fetch method on the DCDR in order to retrieve the source code for illustration, the class data for compilation and the schema data for XML transmission (if the XML B2B type is supported).

These components can then be used as appropriate by the DDE.

The Template generator 840

Modern IDEs have the provision for generating the skeleton of a source file based upon the interfaces that the class implements or abstract classes that it extends. For the DDE however we can limit the applicable interfaces as the only interfaces that can be accepted are those supported by the dynamic system.

The template generator when being run first contacts the dynamic system through the configurable communications bean 860 and calls the required "getManagedEntityTypes" method of the dynamic system {1} ((2) in FIG. 8(b)). This list is then presented to the user in the form of a selection box. Upon choosing an interface type, an extends option is provided which uses the chosen interface type to query the DCDR ((3) in FIG. 8(b)) in order to retrieve all implementing classes and sub-interfaces, in order to facilitate efficient code reuse.

The code is then generated using standard code generation technologies. Referring now to FIG. 8(b), any new code is then sent both to the DCDR (4A) and to the service via the DOCU (4B). The DOCU requests the object type from the DCDR (5) which will have already received it directly from the DDE so that it can now be passed to the DOCU (6).

Class Modification Utility (Not Shown)

The alternative to engineering managed entity types is the addition and/or modification of the systems business logic. Modifying a business module first requires getting the current version of the business logic from the DCDR and loading it into the editor for the user to modify. When the user saves, assuming the auto-compiler (820) does not throw any errors, there is an option to 'trial' on the server; this performs a temporary update of the business component via the LRU (30) so testing can be performed on the new component. This change can then be reversed or committed. If it is committed the DCDR is updated and the LRU set for WAR file update upon shut-down (may never occur, but the temporary files will have been updated so it will not matter).

Library Importer (850)

Unlike a traditional IDE the library of imports must be generated from the aggregation of the appropriate standard Java libraries (presumed local in all cases), and the dynamic system libraries (held remotely). Imports are done from sub-interface to super interface level and following extends paths in order to get the full list. Unlike traditional libraries the imports are done on a per file basis rather than a collection or pre-packaged JAR file, this means that importing a library takes longer, but is of smaller size, considerably more flexible and cannot have selection issues.

Should the system need to export to a non-dynamic context a single library JAR can be compiled from all the dynamic imports.

Conflict Resolution Module (815)

The DDE also acts as an interface to any object conflicts that could occur in the system due to B2B interactions. If an Object that already exists within a specific domain enters a system which already has a similarly named, but differently functional object, then a conflict will be flagged. This flag will be stored by the DCDR until a DDE is online and available, whereby it will be notified of the conflict via the conflict resolution module 815 and a human user can discern the best possible solution for the conflict.

NOTE: the most likely occurrence of this will be de-synchronised versions of the same object and so the logic and values of each definition should be studied in order to gauge the most appropriate. If it is the external system communicating through the B2B interface it must be informed appropriately.

Example Procedure Using the Framework

As an example of the use of the framework described above, there is described below the set of steps required to be carried out by a developer to convert an existing Java EE compliant application to one which is compatible with the above described framework.

1. The first step is to modify the DOCU's filter to intercept all input classes.
2. Then the Java EE platform is initiated (with all of the components of the framework).
3. Then the old application is deployed via the DDE—this will cause all of the classes needed by the application to be loaded into the DCDR since the DOCU's filter is intercepting all input classes.
4. The Java EE server is then shut down (but the state of the server at shut-down is recorded in the normal way).
5. While off-line, the DOCU's filter is reset to its normal state where it will automatically determine what to filter dynamically on start-up by communicating with the application).
6. The Java EE server platform is then re-initiated (with the normal DOCU) and with the App still deployed.
7. Using the DDE the source code for the main portion (probably a bean) of the application is located (e.g. the one with a "main" method) and the source code is amended to cause it to import the DOCU and to specify appropriate values for the DOCU's filter.
8. The amended code is then committed (causing it to be stored in the DCDR and dynamically "placed" in the server via the LRU).
9. The DDE is then used to find any Message Driven Beans and these are then similarly modified to import the DXOH and to cause any received messages to be first processed by the DXOH.
10. This code is then committed (to store it in the DCDR and have it replace the old MDB's via the LRU).
11. If the application includes any entity beans, all components calling these should be found and similarly modified and committed to instead use the BEMU.

The invention claimed is:

1. A server computer system comprising:
   a server computer running a first and a second version of a component or application simultaneously, the component or application including a class;
   an extractor adapted to extract class data for the class from a received object permitting the creation of an object of the class;

a non-transitory storage medium adapted to store said class data;

an indexer adapted to index the class data with reference to an origin of received object;

a receiver for receiving generic requests from a requesting client for the component or application including the class to perform a function, the generic request being non-specific to a version of the component or application;

a version identifier operable to identify one of the versions of the component or application including the class as a currently applicable version; and a connection module operable to connect the requesting client to the currently applicable version of the component or application including the class to process the request; wherein the version identifier includes a non-transitory storage medium storing an association between a generic name of the component or application including the class and the currently applicable version of the component or application including the class.

2. A system according to claim 1 further operable to provide a version specific identity to a newly received component or application automatically and to provide the version specific identity to clients in response to receiving a generic request for the newly received component or application whilst a generic name is advertised more widely to clients who might wish to use the component or application.

3. A system according to claim 1 further comprising means for receiving an updated version of a component or application running on the server computer system, means for automatically assigning a version specific identity to the received updated version, and means for changing an association with a generic name of the component or application from the running version to the updated version.

4. A system according to claim 3 further comprising means for automatically reverting the association of the generic name back to the non-updated version in the event that a predetermined condition or conditions are satisfied.

5. A system according to claim 3 further comprising means for receiving additional supporting data for use with the updated version and storing this in association with the updated version in addition to the corresponding data stored in association with the running version.

6. A system according to claim 1 further including an object persistence manager comprising receiving means for receiving an object identified as having data which is to be persisted;

mapping means for generating a mapping between the data associated with the object and a table or set of tables in an underlying data store; and processing means for storing the associated data in the underlying database in accordance with the mapping generated by the mapping means.

7. A method of operating a server computer system including a server computer the method comprising:

running, on the server computer system including the server computer, a first and a second version of a component or application simultaneously, the component or application including a class;

extracting class data for the class from a received object permitting the creation of an object of the class;

storing the class data;

indexing the class data with reference to an origin of the received object;

receiving a generic request from a requesting client for the component or application including the class to perform a function, the generic request being non-specific to a version of the component or application including the class;

identifying one of the versions as a currently applicable version of the component or application including the class; and connecting the requesting client to the currently applicable version of the component or application including the class to process the request; wherein the identifying step includes storing an association between a generic name of the component or application including the class and the currently applicable version of the component or application including the class.

8. A method according to claim 7 further comprising providing a version specific identity to a newly received component or application automatically and providing the version specific identity to clients in response to receiving a generic request for the newly received component or application whilst a generic name is advertised more widely to clients who might wish to use the component or application.

9. A method according to claim 7 further comprising receiving an updated version of a component or application running on the server computer system, automatically assigning a version specific identity to the received updated version, and changing an association with a generic name of the component or application from the running version to the updated version.

10. A method according to claim 9 further comprising receiving additional supporting data for use with the updated version and storing this in association with the updated version in addition to the corresponding data stored in association with the running version.

11. A method according to claim 7, further comprising receiving a first object identified as having data associated with the object which is to be persisted;

automatically generating a mapping between the data associated with the object and a table or set of tables in an underlying data store; and storing the associated data in the underlying database in accordance with the generated mapping.

12. A non-transitory computer-readable storage medium storing instructions which upon execution by a server computer system performs a method, the method comprising:

running a first and a second version of a component or application simultaneously, the component or application including a class;

extracting class data for the class from a received object permitting the creation of an object of the class;

storing the class data;

indexing the class data with reference to an origin of the received object;

receiving a generic request from a requesting client for the component or application including the class to perform a function, the generic request being non-specific to a version of the component or application including the class;

identifying one of the versions of the component or application including the class as a currently applicable version; and connecting the requesting client to the currently applicable version of the component or application including the class to process the request; wherein said identifying includes storing an association between a generic name of the component or application including the class and the currently applicable version of the component or application including the class.

13. The non-transitory computer-readable storage medium according to claim 12, wherein the method further comprises providing a version specific identity to a newly received component or application automatically and providing the version specific identity to clients in response to receiving a generic request for the newly received component or application while a generic name is advertised more widely to clients who might wish to use the component or application.

14. The non-transitory computer-readable storage medium according to claim 12 wherein the method further comprises receiving an updated version of a component or application running on the server computer system, automatically assigning a version specific identity to the received updated version, and changing an association with a generic name of the component or application from the running version to the updated version.

15. The non-transitory computer-readable storage medium according to claim 14 wherein the method further comprises receiving additional supporting data for use with the updated version and storing this in association with the updated version in addition to the corresponding data stored in association with the running version.

16. The non-transitory computer-readable storage medium according to claim 12, wherein the method further comprises:
   receiving a first object identified as having data associated with the object which is to be persisted;
   automatically generating a mapping between the data associated with the object and a table or set of tables in an underlying data store; and
   storing the associated data in the underlying database in accordance with the generated mapping.

\* \* \* \* \*